United States Patent
Hemerka

(10) Patent No.: US 10,813,303 B2
(45) Date of Patent: Oct. 27, 2020

(54) FLOWER POT

(71) Applicant: Alfred Hemerka, Vienna (AT)

(72) Inventor: Alfred Hemerka, Vienna (AT)

( * ) Notice: Subject to any disclaimer, the term of this patent is extended or adjusted under 35 U.S.C. 154(b) by 0 days.

(21) Appl. No.: 16/625,874

(22) PCT Filed: Jun. 29, 2018

(86) PCT No.: PCT/AT2018/060129
§ 371 (c)(1),
(2) Date: Dec. 23, 2019

(87) PCT Pub. No.: WO2019/000007
PCT Pub. Date: Jan. 3, 2019

(65) Prior Publication Data
US 2020/0146232 A1    May 14, 2020

(30) Foreign Application Priority Data
Jun. 29, 2017  (AT) .................................. 50532/2017

(51) Int. Cl.
*A01G 27/02*  (2006.01)
*A01G 9/04*  (2006.01)
(Continued)

(52) U.S. Cl.
CPC ............. *A01G 27/006* (2013.01); *A01G 9/02* (2013.01); *A01G 9/04* (2013.01)

(58) Field of Classification Search
CPC .... A01G 27/006; A01G 27/008; A01G 27/00; A01G 27/02; A01G 9/02; A01G 9/04;
(Continued)

(56) References Cited

U.S. PATENT DOCUMENTS

| | | | | |
|---|---|---|---|---|
| 576,850 A | * | 2/1897 | Iken ....................... | A01G 27/04 47/80 |
| 1,272,713 A | * | 7/1918 | Reily ..................... | A01G 27/02 47/79 |

(Continued)

FOREIGN PATENT DOCUMENTS

| | | |
|---|---|---|
| CH | 572301 A5 | 2/1976 |
| CN | 2317629 Y | 5/1999 |

(Continued)

OTHER PUBLICATIONS

International Preliminary Report on Patentability (with English translation) issued in corresponding International Patent Application No. PCT/AT2018/060129 dated Jul. 30, 2019 (18 pages).

(Continued)

*Primary Examiner* — Kathleen I Alker
(74) *Attorney, Agent, or Firm* — Kilyk & Bowersox, P.L.L.C.

(57) ABSTRACT

The invention relates to a flower pot (1) comprising an inner element (2) with a cover (4) in which multiple fluid openings (8) are formed, an outer element (3) which surrounds the inner element (2) and which has a base (9), a lateral wall (10) protruding from the base (9) and a liquid storage chamber (11), the height of the lateral wall (10) of the outer element (3) being lower than the cover (4) of the inner element (2) and, at least one filling and viewing opening (12) between the inner element (2) and the outer element (3) for filling the liquid storage chamber (11) with liquid and for visually checking a level of the liquid in the liquid storage chamber (11) of the outer element (3).

14 Claims, 19 Drawing Sheets

(51) Int. Cl.
*A01G 27/00* (2006.01)
*A01G 9/02* (2018.01)

(58) Field of Classification Search
CPC ........ A01G 9/042; A01G 9/045; A01G 9/024; A47G 7/02; A47G 7/025; A47G 7/04; A47G 7/041; A47G 7/042; A47G 7/044; A47G 7/045; A47G 7/047
See application file for complete search history.

(56) References Cited

U.S. PATENT DOCUMENTS

| | | | | |
|---|---|---|---|---|
| 1,707,551 | A * | 4/1929 | Hale | A01G 9/026 47/79 |
| 2,514,269 | A * | 7/1950 | Wilberschied | A01G 9/02 47/81 |
| 2,741,875 | A * | 4/1956 | Staaldu | A01G 9/029 47/75 |
| 3,243,919 | A * | 4/1966 | Carlson | A01G 27/00 47/79 |
| 3,949,524 | A * | 4/1976 | Mickelson | A01G 9/02 47/79 |
| 3,965,616 | A * | 6/1976 | Ridgeway | A01G 9/02 47/65.5 |
| 3,981,099 | A * | 9/1976 | Dziewulski | A01G 9/04 47/67 |
| 4,040,207 | A * | 8/1977 | Lancaster | A01G 27/008 47/80 |
| 4,092,804 | A * | 6/1978 | Morris | A01G 9/04 47/71 |
| 4,151,680 | A * | 5/1979 | Sena | A01G 9/022 47/39 |
| D255,339 | S * | 6/1980 | Christian | D11/152 |
| 4,224,764 | A * | 9/1980 | Dziewulski | A01G 9/04 215/393 |
| 4,265,050 | A * | 5/1981 | Buescher | A01G 27/02 47/71 |
| 4,299,055 | A * | 11/1981 | Dziewulski | A01G 9/04 47/71 |
| 4,315,382 | A * | 2/1982 | Kay | A01G 9/042 47/71 |
| 4,325,202 | A * | 4/1982 | Liard | A01G 9/02 428/8 |
| 4,557,070 | A * | 12/1985 | Oyama | A01G 27/04 47/80 |
| 4,803,806 | A * | 2/1989 | Ito | A01G 9/00 248/27.8 |
| 5,022,183 | A * | 6/1991 | Bohlmann | A01G 9/045 206/423 |
| 5,044,120 | A * | 9/1991 | Couch | A01G 9/02 47/73 |
| 5,241,784 | A * | 9/1993 | Henry | A01G 9/029 47/66.1 |
| 5,481,826 | A * | 1/1996 | Dickinson | A01G 9/04 47/39 |
| 5,638,638 | A | 6/1997 | Moskowitz | |
| 5,852,896 | A * | 12/1998 | Flasch, Jr. | A01G 27/02 47/79 |
| 6,131,334 | A * | 10/2000 | Fan | A01G 9/04 47/71 |
| D460,717 | S * | 7/2002 | Fan | D11/152 |
| 6,510,653 | B1 | 1/2003 | Workum et al. | |
| 6,862,843 | B2 * | 3/2005 | Missry | A01G 13/0212 47/65.5 |
| 7,536,829 | B2 * | 5/2009 | Genma | A01G 9/02 47/67 |
| 7,690,150 | B2 * | 4/2010 | Orschulik | A01G 9/04 47/66.1 |
| 8,745,921 | B2 * | 6/2014 | Boyce | A47B 23/00 206/560 |
| 9,185,853 | B1 * | 11/2015 | Ascherman | A01G 9/02 |
| 9,439,370 | B2 * | 9/2016 | Donnelly | A01G 27/06 |
| 2003/0217507 | A1 * | 11/2003 | Wolverton | A01G 9/02 47/39 |
| 2006/0032132 | A1 * | 2/2006 | Liffers | A01G 9/04 47/71 |
| 2010/0162624 | A1 | 7/2010 | Bradley | |
| 2015/0250107 | A1 | 9/2015 | Joseph et al. | |
| 2016/0150740 | A1 * | 6/2016 | Rentzhog | A01G 9/028 47/66.1 |
| 2016/0212944 | A1 * | 7/2016 | Holby | A01G 9/02 |
| 2019/0183065 | A1 * | 6/2019 | Ryan | A01G 9/028 |

FOREIGN PATENT DOCUMENTS

| | | | | |
|---|---|---|---|---|
| CN | 102972226 A | | 3/2013 | |
| DE | 1747017 U | | 6/1957 | |
| DE | 7535997 U | * | 4/1976 | ............ A01G 31/02 |
| DE | 19929409 A1 | * | 1/2001 | ............ A01G 9/02 |
| JP | H0984465 A | | 3/1997 | |
| JP | 2006206427 A | | 8/2006 | |
| JP | 2016111932 A | | 6/2016 | |
| WO | 0110193 A1 | | 2/2001 | |
| WO | 2014134662 A1 | | 9/2014 | |

OTHER PUBLICATIONS

Office Action received in corresponding Austrian Patent Application No. A 50532/2017 dated Nov. 30, 2017 (4 pages).

International Search Report and Written Opinion issued in corresponding International Patent Application No. PCT/AT2018/060129 (with English translation of International Search Report) dated Nov. 28, 2018 (19 pages).

* cited by examiner

XII-XII

Fig. 14   XIV-XIV

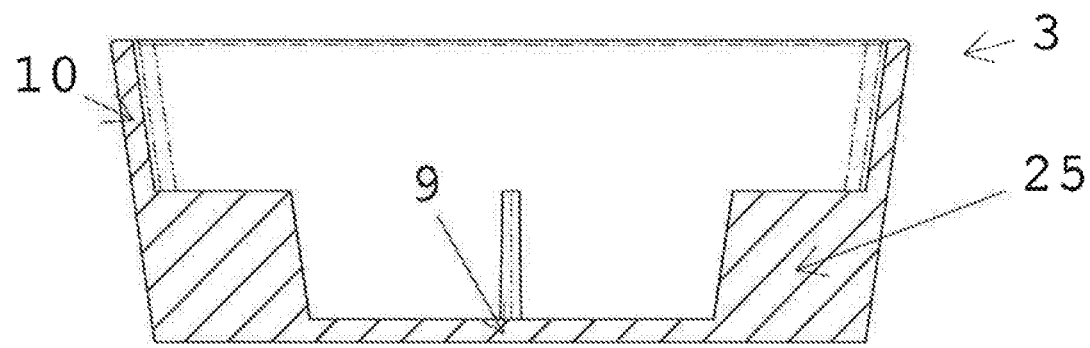
Fig. 17  XVII-XVII
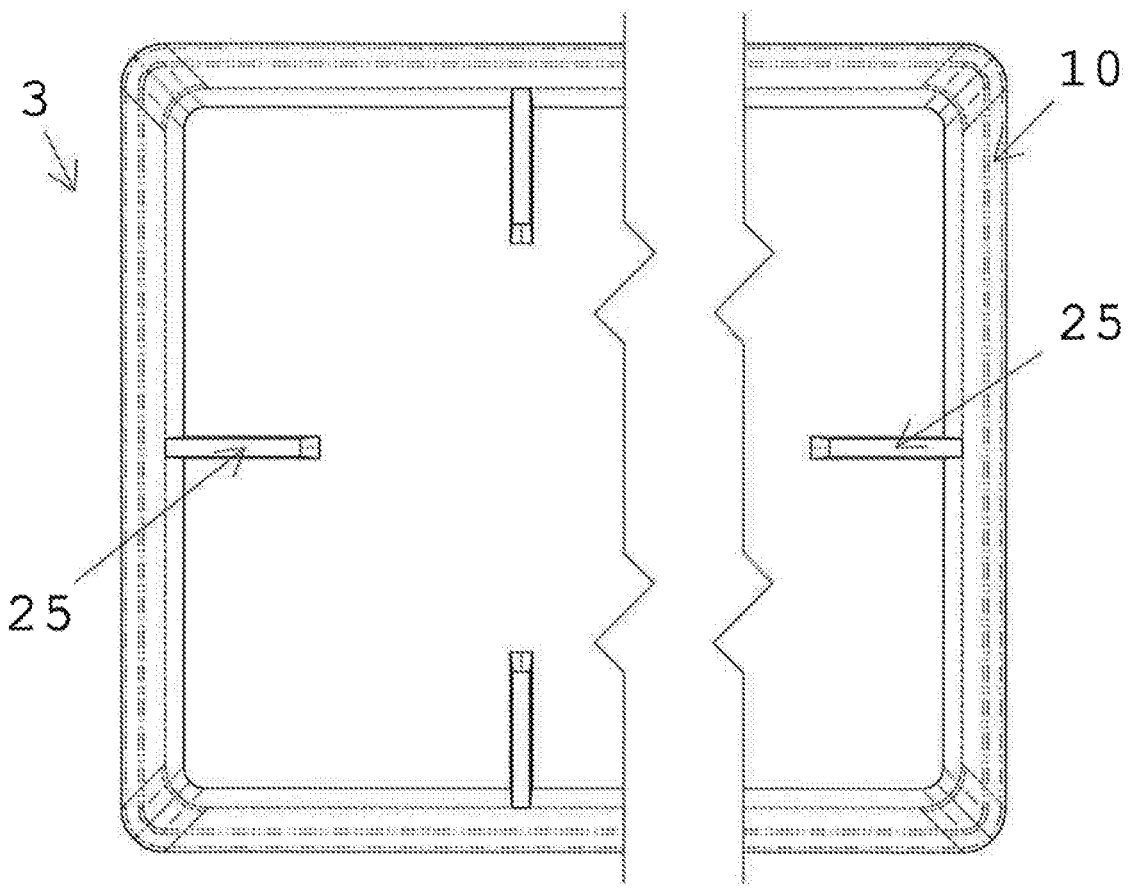
Fig. 18

XXI-XXI

XXIII-XXIII

FLOWER POT

This application is a National Stage Application of PCT/AT2018/060129, filed Jun. 29, 2018, which claims priority to Austrian Patent Application No. A 50532/2017, filed Jun. 29, 2017.

The invention relates to a flower pot comprising
an inner element comprising a cover, on which a plurality of liquid passage openings are formed,
an outer element surrounding the inner element, comprising a base, a lateral wall protruding from the base, and comprising a liquid storage chamber.

A large variety of embodiments of flower pots of this type are known in the prior art.

DE 75 35 997 U shows a generic plant pot for hydroponic and soil cultivations comprising an inner pot receiving the plant, the wall of which has a plurality of water passages. In the lateral wall of the inner pot there are located strip-shaped notches, which are arranged distributed at regular intervals over the circumference and which, starting at the base, protrude as far as the height of an intermediate base. Three of the notches in each case represent open apertures, through which water can reach into the inner pot. The upper ends of the notches, which protrude into the interior of the inner pot, form a support for the intermediate base. When used for hydroponics, the intermediate base is removed. For a soil cultivation, the intermediate base is inserted. In both cases, the inner pot is inserted completely into an outer pot, which is filled with water. To control the water reserve, a conventional water level indicator comprising a float ball is provided in a cylindrical tube.

A disadvantage of this is in particular the complicated, voluminous design of the known hydroponics plant pot. The water level indicator is furthermore unreliable and is also furthermore structurally complex.

DE 20 2015 100256 U1 shows a storage container for a plant pot. A base, which together with a lateral wall forms a water reservoir, is located at the lower end of the storage container. Said water reservoir serves to receive water and to supply the integrated plant pot with water. Over the entire height with the exception of an upper lateral wall section facing outwards over a support shown as a holding collar, the lateral wall has a décor element, which in the present case has a décor in the form of a plurality of small patterns. Via the support, a plant pot can be arranged so as to hang in the storage container, it is simultaneously limited in its movement to the outside via the lateral wall section, and has a defined seat. The décor element has a plurality of markings, which are to indicate a maximum water level or a maximum fill level, respectively, of the water reservoir. Both markings are arranged laterally of a water level indicator, which is formed by a viewing window. This viewing window results from a recess in the décor and the transparent plastic of the further lateral wall in the décor-free area. The water level indicator is thus formed by a recess in the décor or is limited by it, respectively.

DE 33 17 785 A1 shows a hetero cultivation plant pot in the form of a double-walled plant pot element. The pot serves for the heterogenization of ornamental plants, whereby it is used as connecting device between two types of plant cultivations, for example for the purpose of long-term watering, the intensification of the generative propagation (flowering) or for the natural spreading of roots, respectively. On the one hand, the humidification of root balls now takes place by means of the inner device shaft, which is filled with fine granules and which is connected via the base apertures to the adjacent inner pot soil aeration, humidification, and drainage granules. The water, which is filled in via the outer edge spacer, which is provided with apertures, stands maximally to the center of the inner plant pot part and fills the space, whereby the granules are also kept moist in the small chamber. The roots also go through the rising chambers, and then downwards, as described above, through the double pot wall and outer shaft apertures.

DE 2106439 A1 shows a universally usable flower pot comprising a water storage, in the case of which it can be seen from a greater distance, how high the water level is. To provide for an easy cleaning of the water container, the latter is screwed on only lightly and can be cleaned at any time—without having to repot the flowers. The flower pot has a support edge for an intermediate insert and the base comprising water holes. The water storage can be embodied completely of transparent plastic or only with perpendicular observation slits, in order to be able to clearly control the water level.

DE 10 2011 005195 A1 shows a transport container for transporting plants, which has at least one cache pot, which can be partially filled with water, comprising a base. It further has a receiving chamber, which is limited by the base and a lateral wall, for receiving a plant pot, which is to be transported, and at least one water level indicator provided in the lateral wall for indicating a current water level in the cache pot. The cache pot can be round or angular. The arrangement of the water level indicators provides for a reading of the water level from several sides.

Apart from the known hydroponics vessels and solutions, which are based on the water storage capacity of the substrate, inventions comprising a limited water reserve in the lower range have established themselves for a multi-day watering in the area of the vessels in the form of soil hydro vessels and cache pots for orchids. Most of the vessels are thus currently optimized for a certain type of substrate, use error-prone water level indicators, viewing windows which are difficult to read or materials, which become covered in algae, are translucent or transparent, respectively, or do not provide any feedback whatsoever to the gardener about the introduced water quantity, without removing the inner pot. In addition, soil hydro vessels are constructed in a complicated manner and the production thereof is thus expensive. Even though cache pots for orchids comprising water reserve are constructed in a simple manner, they become increasingly unstable due to the conical shape and only have a very limited water reserve.

In contrast, the object of the present invention is to reduce or eliminate, respectively, at least individual disadvantages of the prior art. The invention in particular has the goal of creating a versatile flower pot or cache pot, respectively, which is equally suitable for various plant cultivations, in particular for hydroponic and soil cultivations, preferably also by using inner pots, whereby the water reservoir is to be capable of being checked easily and reliably, and which is preferably designed in such a way that an expedient limitation of the water quantity is simultaneously effected especially for the use outside.

This object is solved by means of a flower pot comprising the features of claim 1. Preferred embodiments are specified in the dependent claims.

In the case of the flower pot according to the invention it is provided that
the lateral wall of the outer element comprises a smaller height than the cover of the inner element and that
at least one filling and viewing opening is formed between the inner element and the outer element for filling liquid into the liquid storage chamber and for visually inspecting a level of the liquid in the liquid storage chamber of the outer element.

The outer element of the flower pot is thus formed as liquid storage container, in which watering liquid or nutrient liquid, respectively, can be stored. The inner element, which serves to receive a plant, is placed in the outer element. To supply the plant with the watering liquid or nutrient liquid, respectively, from the liquid storage chamber of the outer element, the liquid passage openings are provided on the circumferential cover of the inner element.

Depending on the embodiment, a hydroponic cultivation or a soil cultivation can be started in the interior of the inner element. In the case of the hydroponic cultivation, the inner element can be filled with conventional hydro substrate.

In the case of a soil cultivation, a plant, for example an orchid, can be placed into the inner element in an inner pot. When in use, the inner pot comprising the soil cultivation is preferably held in the inner element in such a way that a base of the inner pot is located above the upper ends of the liquid passage openings. The roots of the soil plant can thus grow through passage openings of the inner pot into the lower area of the inner element, which lower area is supplied with the liquid by the outer element. In the case of this embodiment, the plant is initially watered via the inner pot. After the roots of the plant have grown in, the watering can also take place only via the outer element.

The inner element can comprise a base part or can be open to the bottom. If said inner element comprises a base part, the soil cultivation can also be started directly in the inner element when the inner element in a possible use is filled with drainage material, for example gravel, leca or material, which conducts in a capillary manner, such as brick chippings semiramis, or with a water storage mat, preferably essentially up to the upper edge of the liquid storage chamber, depending on the water requirement of the plant. In the case of this possible use, the function essentially corresponds to that of known soil hydro vessels, but without the complicated setup thereof. In particular in the case of larger embodiment of the flower pot, this can represent a preferred use, because in many cases, no inner pots are available in this size. If the inner element is open on the bottom, the inner element is preferably used with an inner pot. In the case of this embodiment, outer and inner element together form a cache pot, which has a water reserve, which is visible from the outside, due to the division into the inner and outer element.

It is now also essential that the outer element is formed in a trough- or shell-shaped manner, i.e. open to the top, wherein the circumferential lateral wall of the outer element surrounds the cover of the inner element. At least a filling or viewing opening, respectively, is thus formed between the inner side of the lateral wall of the outer element and the outer side of the cover of the inner element.

This filling or viewing opening, respectively, thus extends at the areas, which are left open, by the inner element, at the upper end of the liquid storage chamber of the outer element. Due to the fact that the outer element only extends over a portion, for example less than half, preferably over essentially one third, of the height of the inner element, the level in the outer element can be seen well from outside. The caretaker of the plant can thus perform a simple visual inspection, whether sufficient liquid is present in the liquid storage chamber. The trough-shaped or shell-shaped embodiment, respectively, of the outer element further ensures an overflow when using the flower pot in the outside area—also with hydroponics. According to a particularly preferred embodiment, the flower pot is free from a (mechanical) water level indicator. The inner and outer element can furthermore be made of an opaque material, preferably of a plastic or a ceramic material. In contrast to some known flower pots, viewing windows are not required on the outer element. A particularly simple, versatile flower pot is thus created, which combines the advantages of known hydroponic and soil hydro pots, namely the presence of a water reserve, with the advantages of conventional soil cultivation pots, which lie in particular in the sleek design and simple embodiment.

For the purposes of this disclosure, the location and direction references, such as "top", bottom", horizontal", vertical", inside", "outside", etc., refer to the intended state of use of the flower pot on a horizontal support surface.

To provide a sufficient liquid reservoir on the one hand and to provide for the control of the level in the liquid storage chamber on the other hand, it is favorable when the ratio between the height of the lateral wall of the outer element and the height of the cover of the inner element (in each case measured at the outer side) is between 1:5 and 1:1.5, preferably approximately 1:3. The ratio between the height of the lateral wall of the outer element and the height of the cover of the inner element is thus much larger than in the case of conventional coasters, which do not take over a storage function, but the outer element, in its function as cache pot, is simultaneously also lower than conventional cache pots.

To provide for a particularly stable arrangement, a plug connection is preferably provided between the outer element and the inner element, by means of which plug connection the inner element, in the mounted state, is arranged on the outer element in a non-tiltable and non-rotational manner around the longitudinal axis of the inner element. The plug connection comprises corresponding plug connection parts on the inner element and on the outer element. When assembling the flower pot, the outer element and the inner element are connected to one another via the plug connection. The plug connection is preferably set up for an insertion of the inner element into the outer element essentially in the longitudinal direction of the inner element (i.e. in the direction of the longitudinal axis thereof). In the mounted state, the inner element is arranged on the outer element in a non-rotational manner at least around the longitudinal axis of the inner element. In addition, the plug connection is preferably set up to limit a tilting of the inner element with respect to the longitudinal axis thereof or to essentially prevent a tilting entirely. The inner element is thus reliably secured to the outer element, and the combination obtains more stability than commercially available cache pots in the form of the inner element, due to the larger support surface.

To attain a stable connection, the plug connection comprises at least two, preferably four, plug connectors and at least two, preferably four, corresponding plug recesses in the case of a preferred embodiment. The plug connectors are preferably provided on the outer element and the plug recesses are provided on the inner element. An even more stable embodiment of the connection is further possible, in the case of which the plug connectors comprise protrusions and the plug recesses comprise corresponding slits. Protrusions are thereby only expedient insofar as the stackability of both elements is not negatively impacted or a simpler separation of stacked elements is to be attained, respectively.

In the case of a structurally simple embodiment alternative of the inner element, preferably made of plastic, the plug recesses are formed as notches (i.e. as areas projection inwards) in the cover of the inner element, wherein top-side mounting surfaces for an inner pot are formed on the notches in the interior of the inner element. In the case of this embodiment, the wall thickness of the cover of the inner element can essentially be constant over the longitudinal direction thereof. Due to the notch on the cover of the inner element, the plug recess for the plug connector is formed on the outer side and the mounting surface for the inner pot is formed on the inner side. The notches thus advantageously take over two functions, so that a material-saving and thus cost-efficient manufacture of the inner element of plastic, in particular as injection molded part, is made possible.

It is furthermore favorable for manufacture-related reasons when the plug connectors are formed as bulges (i.e. as areas protruding to the top) on the base of the outer element. In the case of this embodiment, the outer element can be formed as plastic part comprising an essentially constant wall thickness. This embodiment is characterized by little material use and low costs.

To facilitate the assembly of the flower pot, it is favorable when the plug connectors and the plug recesses in each case taper towards the filling and viewing opening in the cross section in the longitudinal direction of the inner element. Advantageously, the insertion of the plug connector into the corresponding plug recess can thus be simplified. For example, the plug connectors can comprise a cross sectional shape, which is elongate in the circumferential direction of the inner element. However, frustoconical plug connectors can also be provided.

In an alternative preferred embodiment, plate parts, which, in the mounted state, are arranged in slit-shaped plug recesses of the inner element, are provided as plug connectors, which plate parts are preferably arranged essentially perpendicular to the lateral wall of the outer element. Depending on the embodiment, the plate parts can extend over the entire width of the outer element or only over a portion thereof.

To provide for the plug connection with the plate parts on the one hand and to facilitate the arrangement of the inner pot in the inner element on the other hand, the slit-shaped plug recesses are formed on depressions in the cover of the inner element in the case of a preferred embodiment alternative, wherein top-side support surfaces for an inner pot are formed on the depressions in the interior of the inner element. In the case of this embodiment, the inner element thus comprises, in particular on the lower end area thereof, depressions (i.e. areas projection inwards with respect to the adjacent sections), on which the slit-shaped plug recesses for the plate parts are provided. Essentially horizontal support surfaces for the inner pot are preferably formed on the top sides of the depressions. This embodiment alternative is in particular suitable for a manufacture of the inner and outer element of a ceramic material.

In the case of a further preferred embodiment alternative, the inner element comprises an upper section, which is preferably essentially conical, and a lower section, which is preferably essentially conical, which are connected to one another via a tapering section, wherein a ledge for an inner pot is formed on the tapering section in the interior of the inner element. In the case of this embodiment, the inner pot for a soil cultivation is held on the ledge of the tapering section.

The above-mentioned support surface, ledge surface or mounting surface, respectively, of the inner element for the inner pot is in each case located at the height of 75 percent to 100 percent, preferably at essentially 80 percent, of the height of the lateral wall of the outer element.

In the case of embodiment in sizes, for which there are no inner pots, it is to preferably be provided that the support, ledge or mounting surfaces, respectively, are dispensed with completely. In the case of corresponding inherent stability of the inner element, the plug connection can also be forgone.

To create large-surface filling and viewing openings between the inner and outer element in the case of small dimensions of the flower pot, it is preferably provided that the cover of the inner element comprises a first cross sectional shape, in particular an essentially circular cross section, and that the lateral wall of the outer element comprises a second cross sectional shape, which differs therefrom, in particular an essentially rectangular cross section, preferably an essentially square cross section.

According to a particularly preferred embodiment alternative, a first number of openings, in particular first slits, and a second number of openings, in particular second slits, are provided as liquid passage openings of the inner element, wherein the first number of openings comprises a larger extension in the longitudinal direction of the inner element than the second number of openings. In the case of this embodiment, the liquid passage openings of different lengths can be used to control the liquid level in the liquid storage chamber. The different liquid passage openings are preferably arranged on the circumference of the inner element so as to alternate in the circumferential direction. The liquid storage chamber is preferably dimensioned in such a way that an optimal water reserve is present, when the liquid level is at the upper end of the shorter liquid passage opening, and that the upper end of the longer liquid passage opening indicates the maximally permitted liquid level.

In the case of a preferred embodiment, the upper edge of the lateral wall of the outer element, in the mounted use state, is located just above the upper end of the first number of openings. The upper edge of the lateral wall of the outer element thus serves as overflow and limits the water level to a little higher than the upper end of the first number of openings. Due to this function of the upper edge of the lateral wall of the outer element as overflow, the flower pot also provides for the starting of hydroponics in the outer area. It is particularly favorable when the height of the lateral wall of the outer element is 1 to 1.5-times, preferably 1.1-times, the extension of the first number of openings in the longitudinal direction of the inner element. In particular for larger vessels in the outer area, it is thereby in particular expedient when the height of the lateral wall of the outer element corresponds to the extension of the first number of openings in the longitudinal direction of the inner element, so that the overflow corresponds exactly to the maximum of the permitted liquid level, while a certain overflow protection is preferred for the use in the inner area.

The inner element can comprise a base part or can be free from a base part of this type. If it comprises a base part, the base of the outer element preferably comprises a depression, which receives the base part of the inner element, in order to prevent that the lowermost part of the water reserve of the outer element cannot flow into the inner element. For this purpose, the base of the outer element is preferably embodied at least in some areas with a larger wall thickness than the base part of the inner element, whereby the outer area of the outer element also becomes more stable.

According to a preferred embodiment alternative, a plurality of inner elements, as described above, are arranged in the same outer element. The inner element preferably comprises an arrangement of plug connection elements, which can be connected to corresponding plug connection elements of a plurality of, preferably similar, inner elements.

To be able to stack a plurality of similar inner or outer elements, respectively, in a storage or transport position, respectively, in a space-saving manner, it is favorable when the inner element and/or the outer element in each case comprises sections, which widen to the top (upwards) in the longitudinal direction.

The invention will be further described below on the basis of preferred exemplary embodiments in the drawings.

FIG. 17 shows a section along the line XVII-XVII in FIG. 16.

FIG. 18 shows an embodiment alternative of the outer element according to FIGS. 15 to 17, which is set up for receiving a plurality of inner elements.

Figure 1:
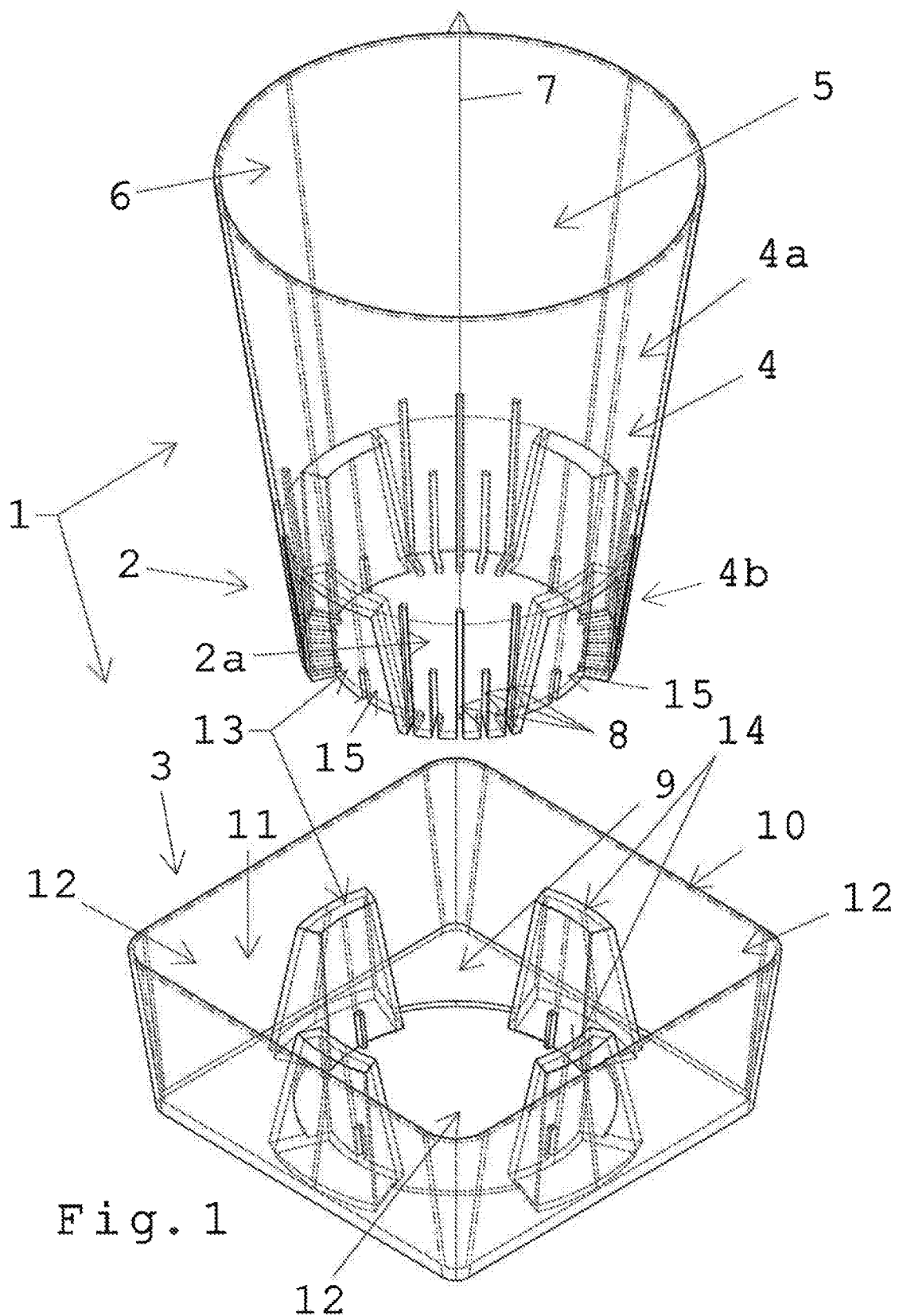
FIG. 1 shows a first embodiment of a flower pot according to the invention when inserting an inner element into an outer element.
Figure 2:
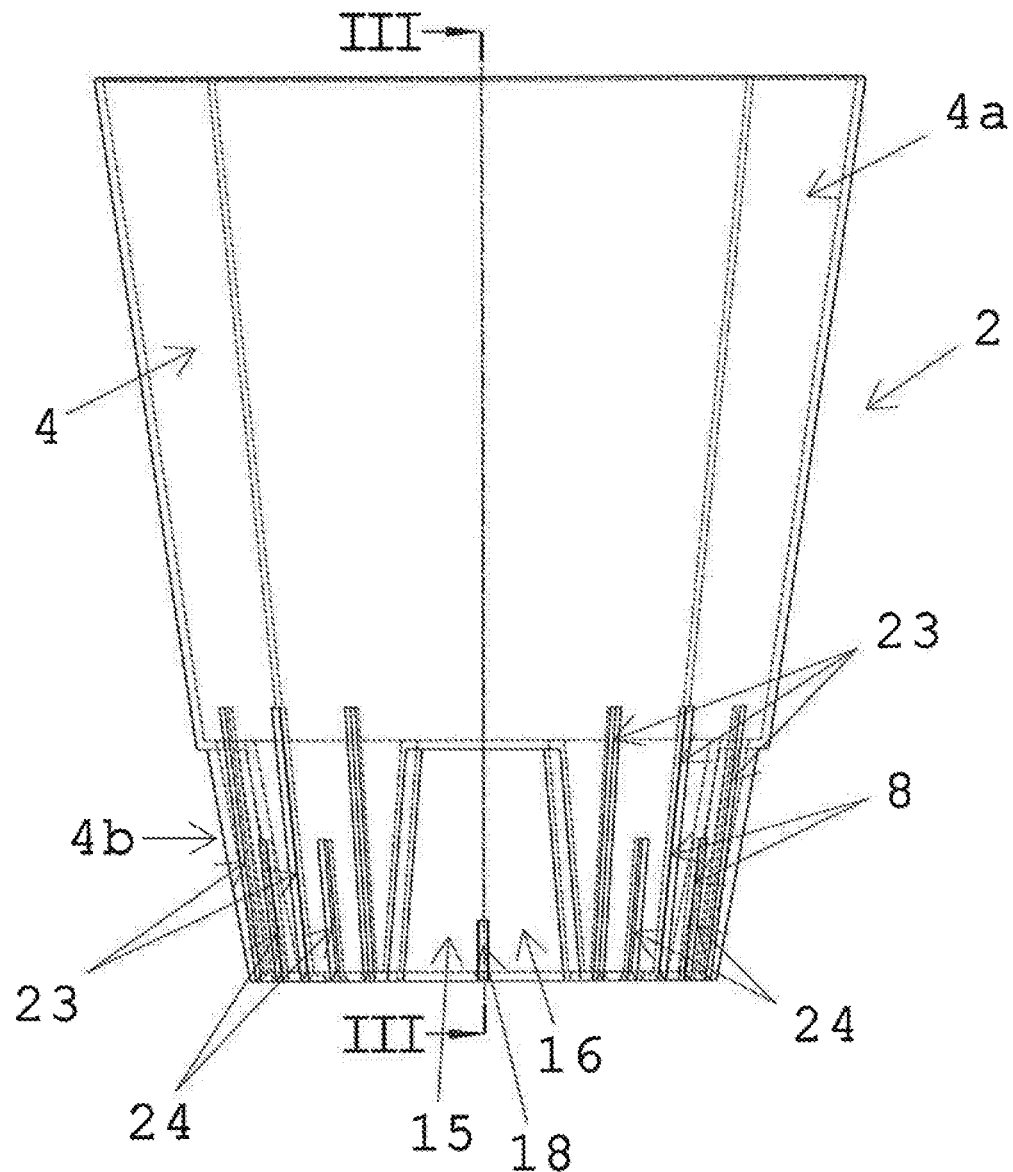
FIG. 2 shows a lateral view of the inner element of the flower pot according to FIG. 1.
Figure 3:
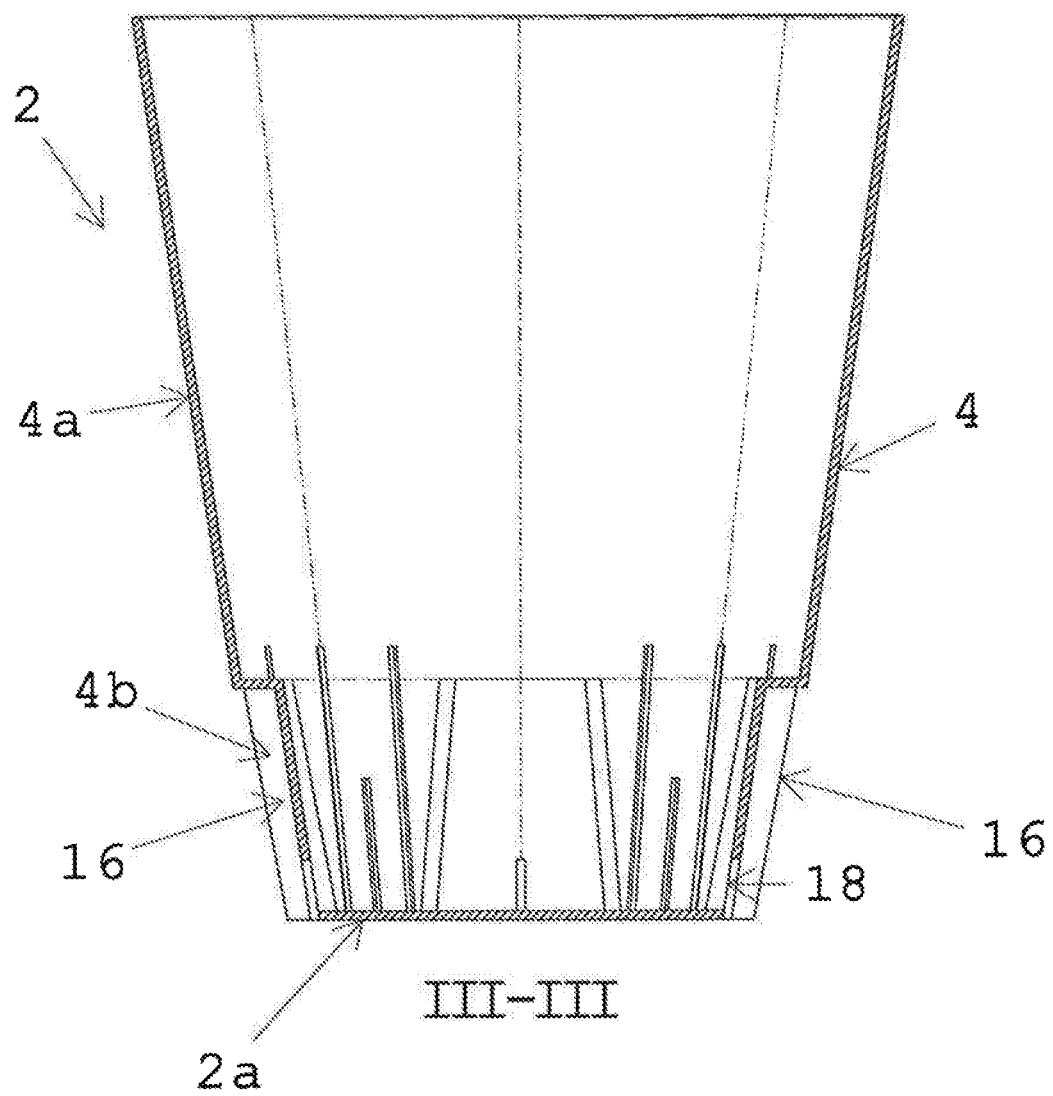
FIG. 3 shows a section along the line III-III in FIG. 2.
Figure 4:
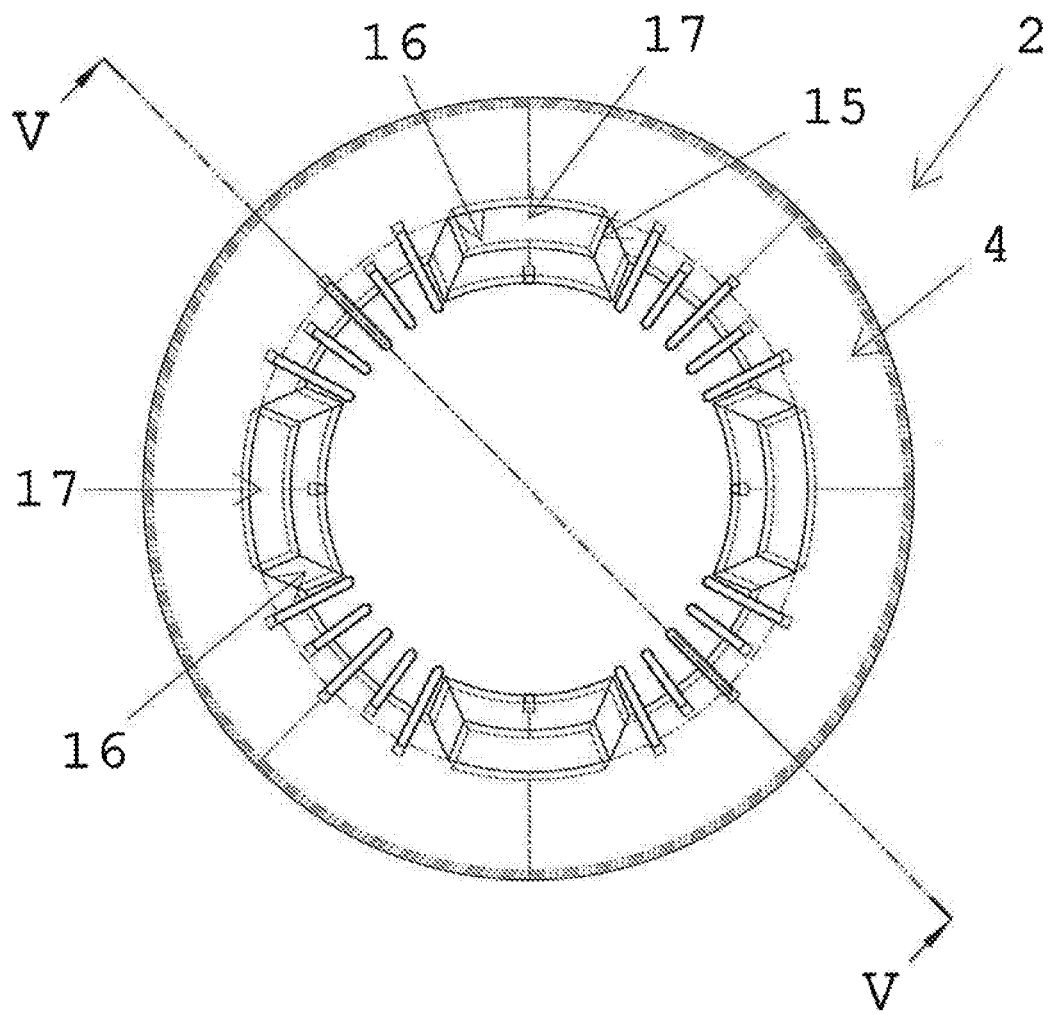
FIG. 4 shows a top view of the inner element according to FIGS. 1 to 3.
Figure 5:
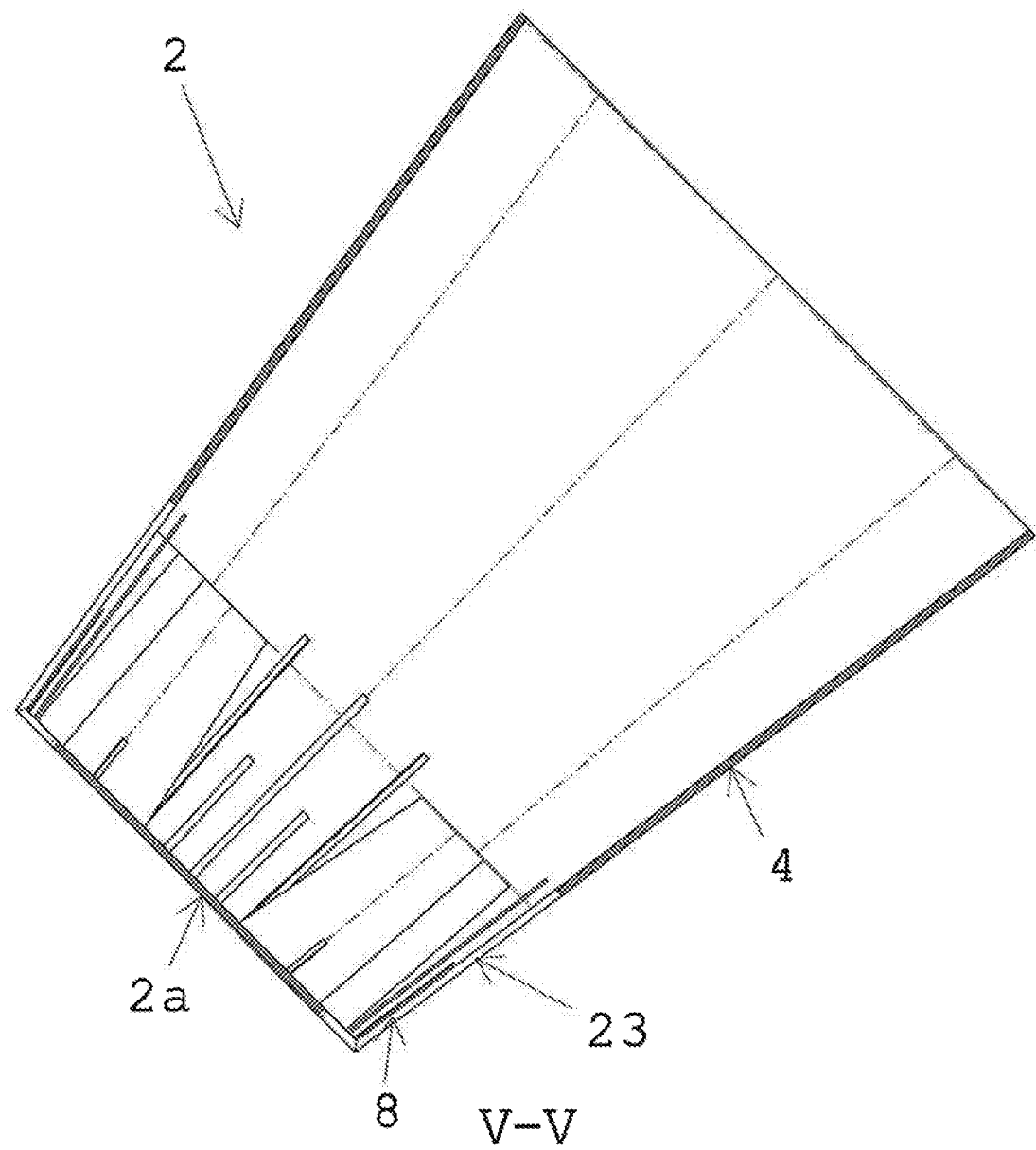
FIG. 5 shows a section along the line V-V in FIG. 4.

A flower pot 1, which has an inner element 2 and an outer element 3, is shown in FIG. 1. The inner element 2 has a circumferential cover 4, which limits a receiving chamber 5 comprising a top-side insert opening 6 for a (non-illustrated) plant or an inner pot comprising a plant. In the embodiment of FIG. 1, the cover 4 has a receiving section 4a for the plant, which receiving section 4a extends over more than half of the height of the inner element 2. The receiving section 4a is widened conically to the top in the direction of a longitudinal axis 7 of the inner element 2. On the lower end, the cover 4 additionally has a watering section 4b, on which a plurality of liquid passage openings 8 are embodied, which will be described in more detail below. In the shown embodiment, the inner element 2 additionally has a base part 2a (see FIG. 3), from the circumferential edge of which the cover 4 protrudes to the top.

Figure 8:
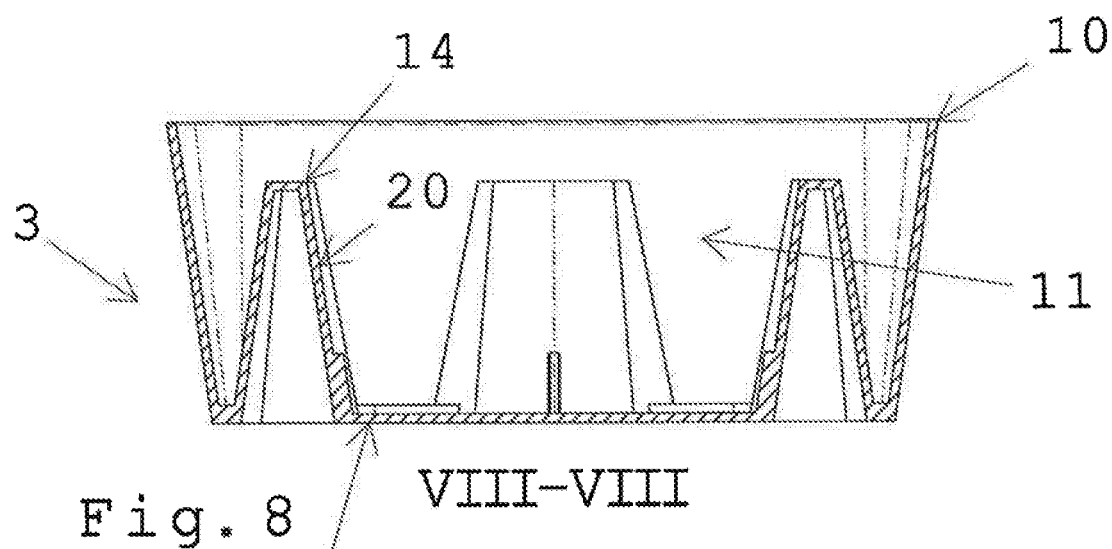
FIG. 8 shows a section along the line VIII-VIII in FIG. 7.
Figure 9:
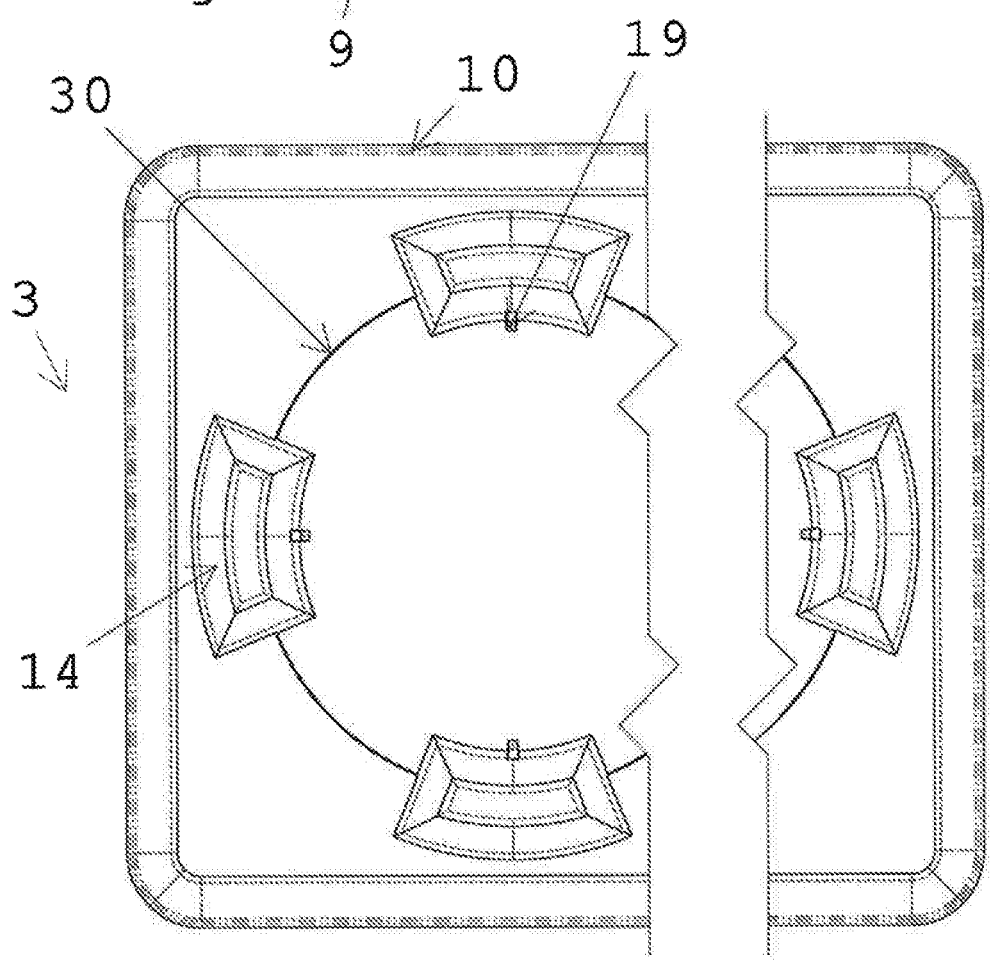
FIG. 9 shows an embodiment alternative of the outer element according to FIGS. 6 to 8, which is set up for receiving a plurality of inner elements.
Figure 10:
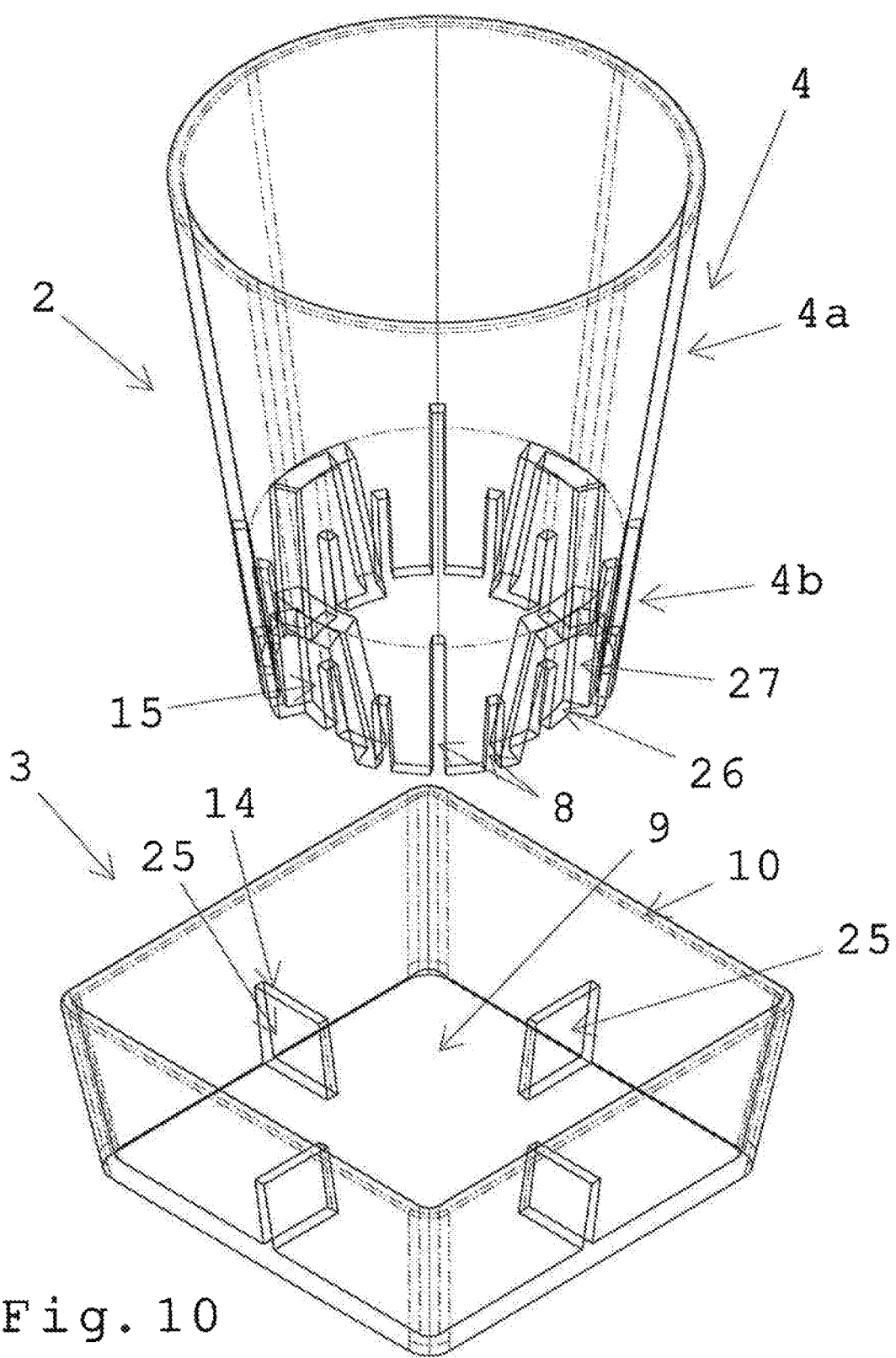
FIG. 10 shows a second embodiment of the flower pot according to the invention when inserting the inner element into the outer element.
Figure 11:
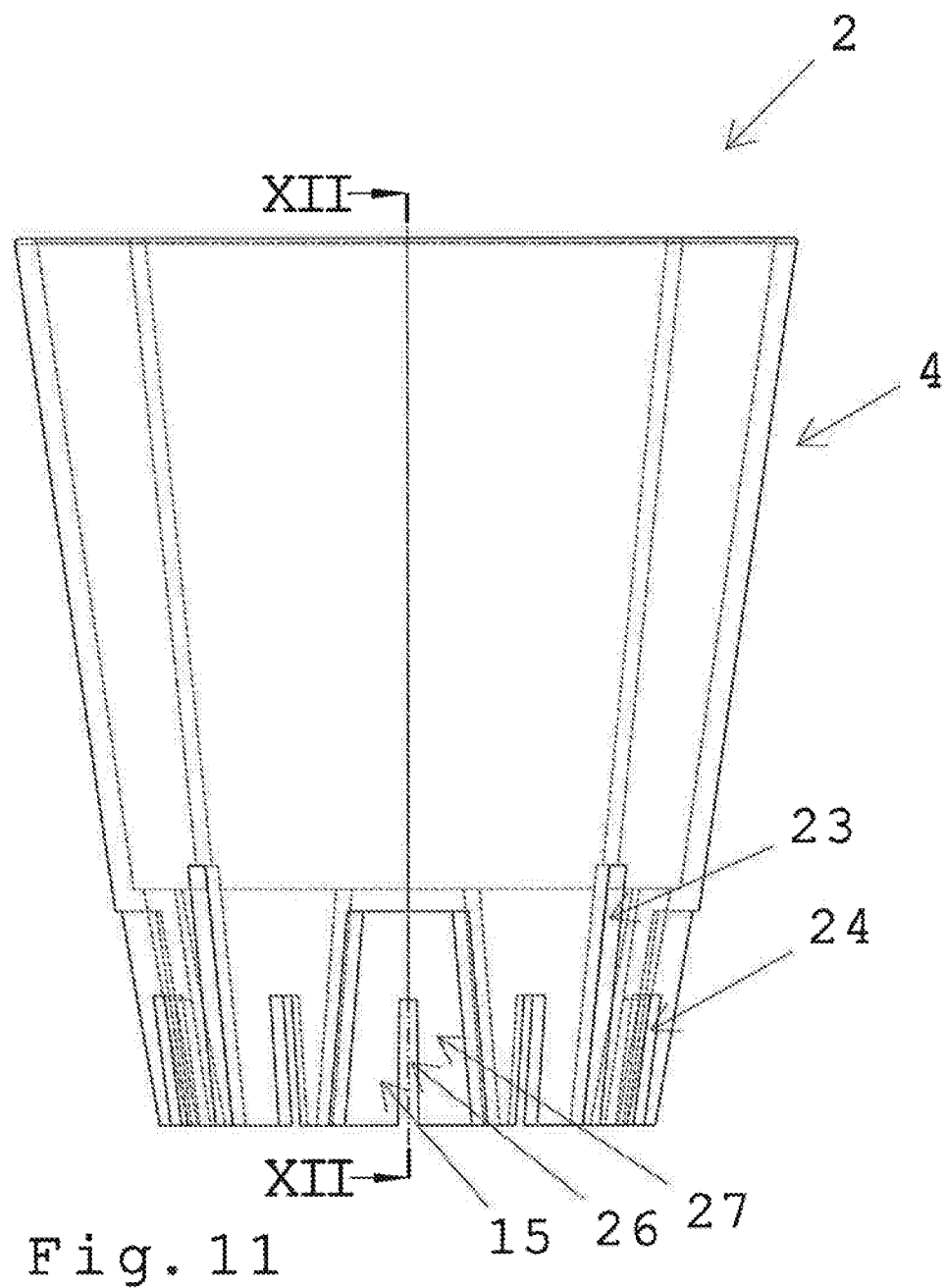
FIG. 11 shows a lateral view of the inner element of the flower pot according to FIG. 10.
Figure 12:
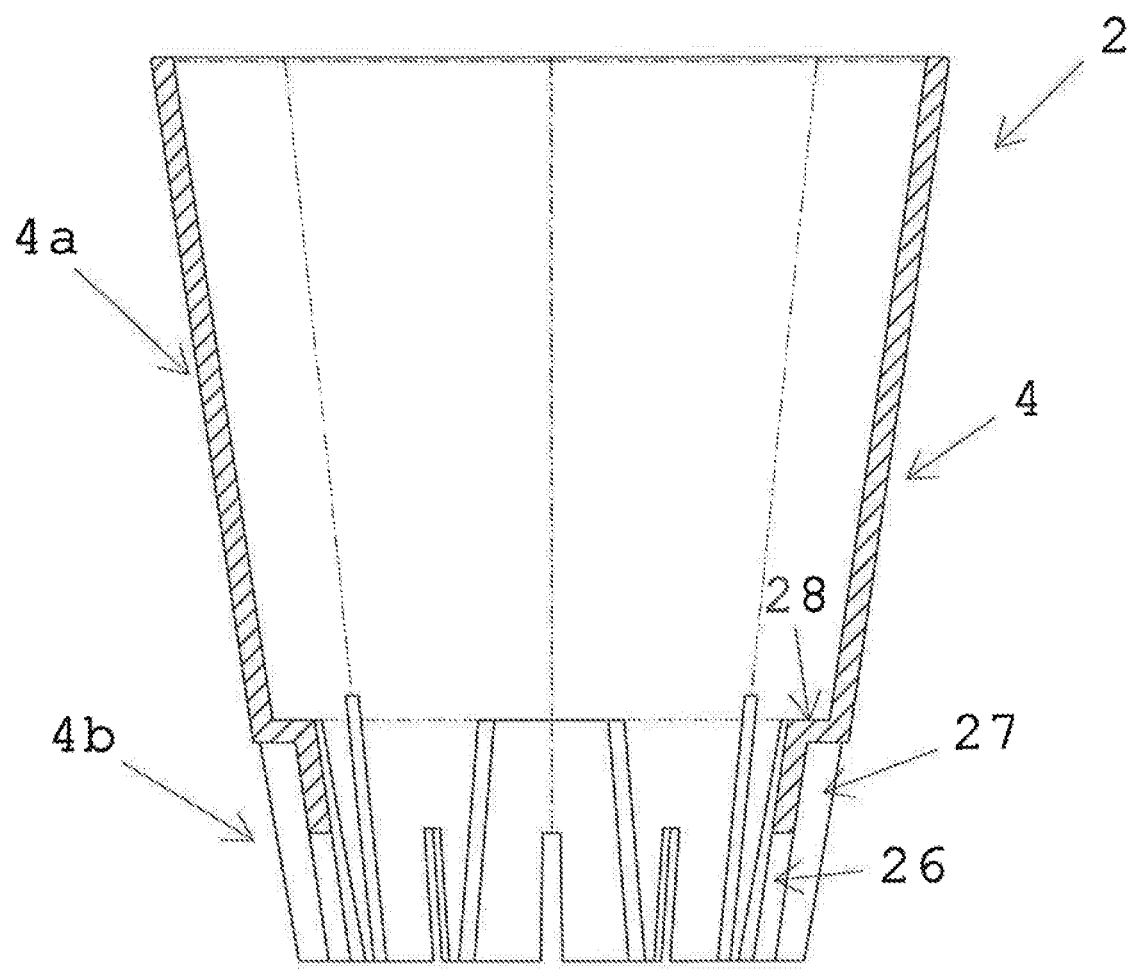
FIG. 12 shows a section along the line XII-XII in FIG. 11.
Figure 13:
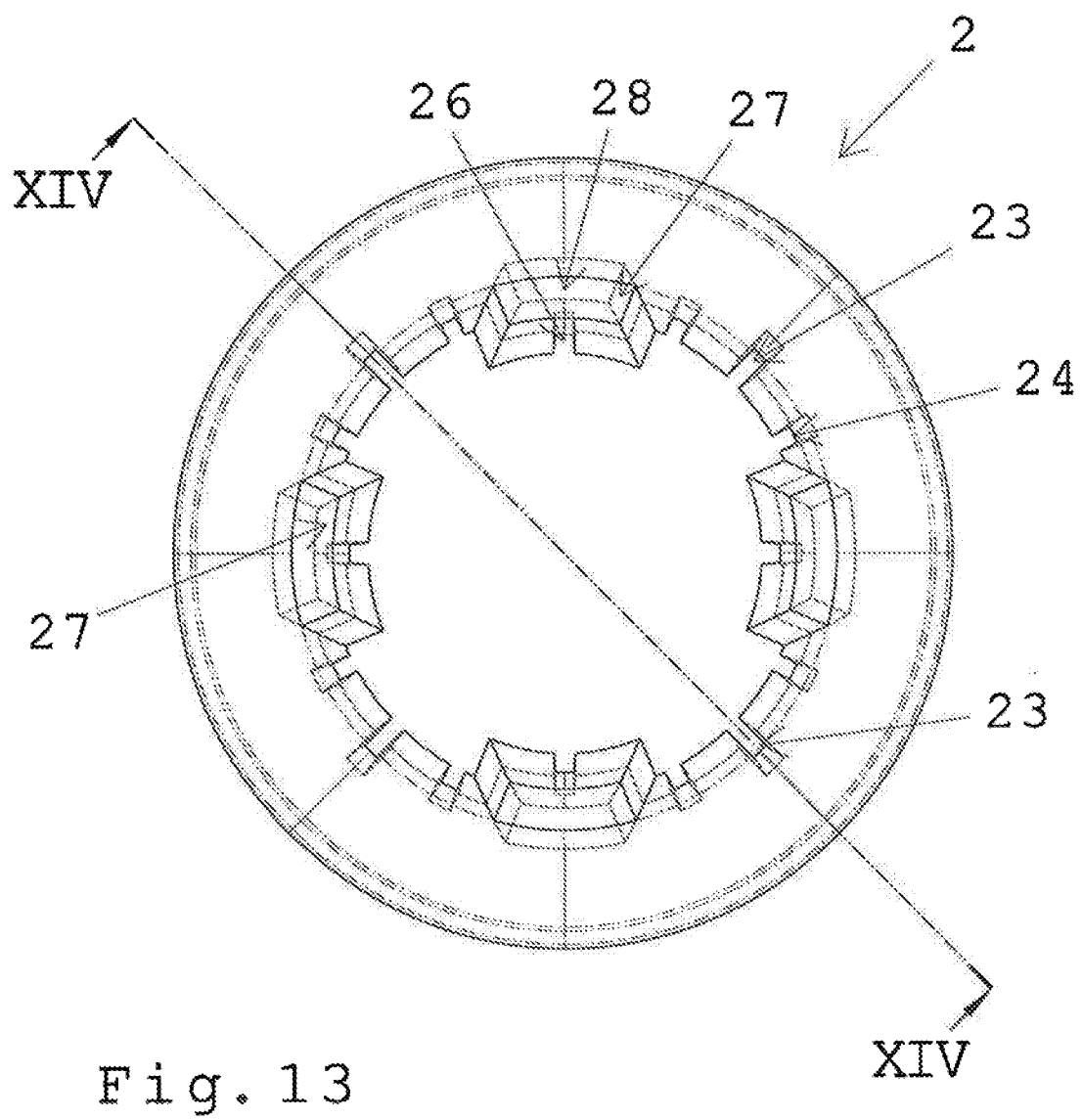
FIG. 13 shows a top view of the inner element according to FIGS. 11, 12.
Figure 14:
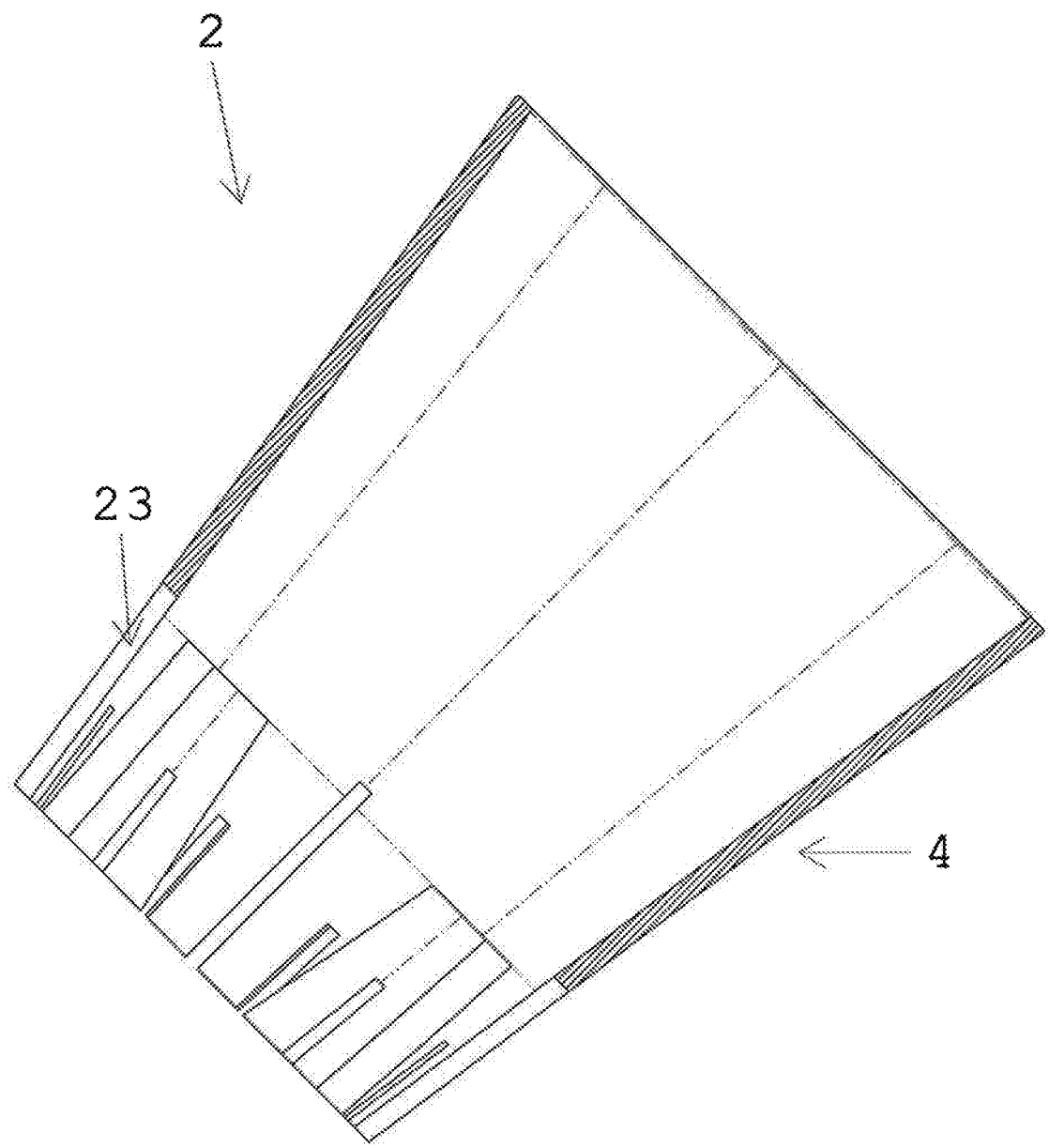
FIG. 14 shows a section along the line XIV-XIV in FIG. 13.
Figure 15:
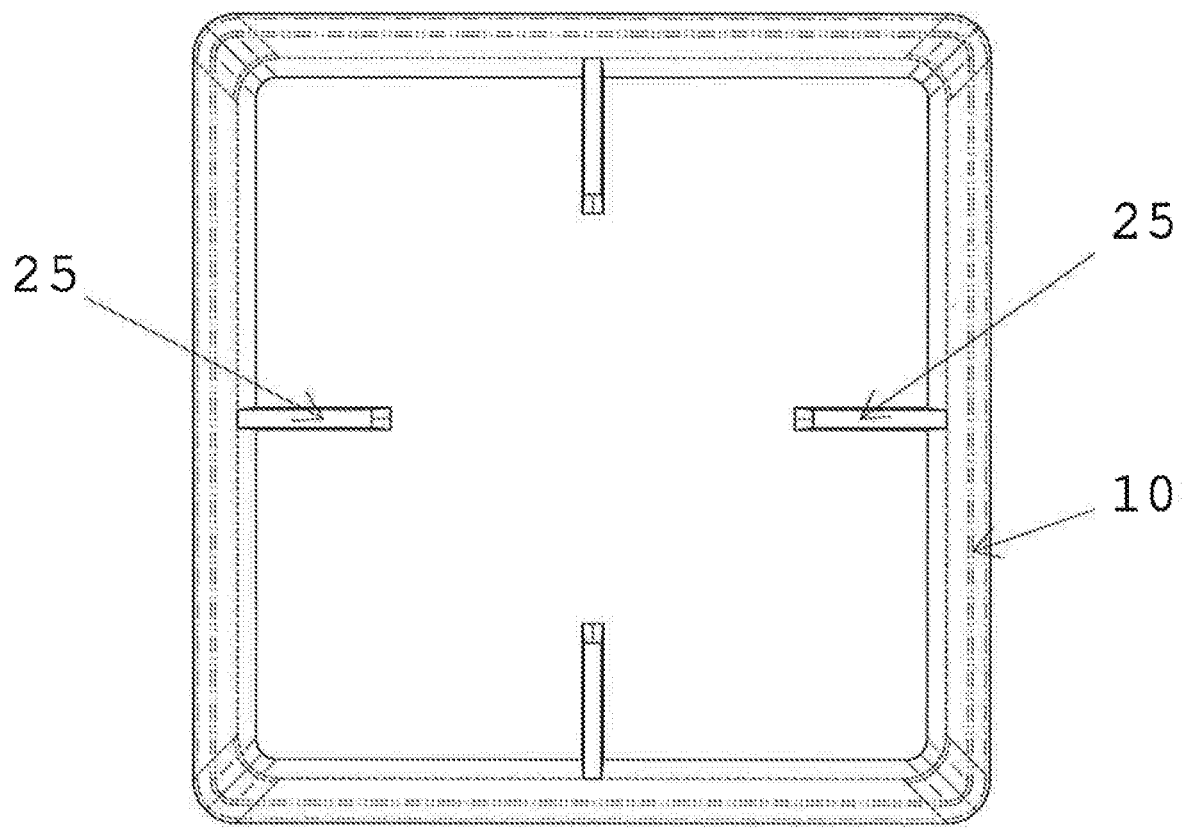
FIG. 15 shows a top view of the outer element of the flower pot according to FIG. 10.
Figure 16:
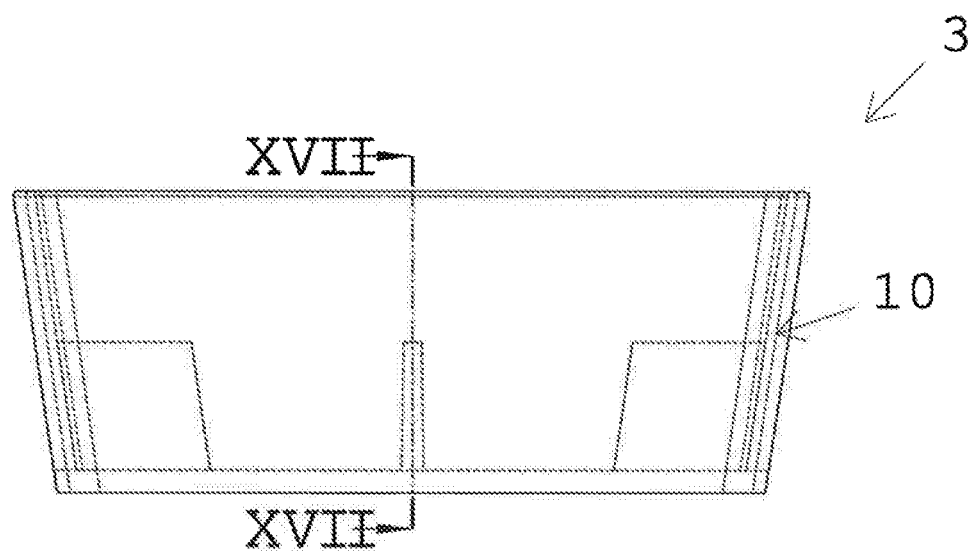
FIG. 16 shows a lateral view of the outer element of the flower pot according to FIG. 15.
Figure 19:
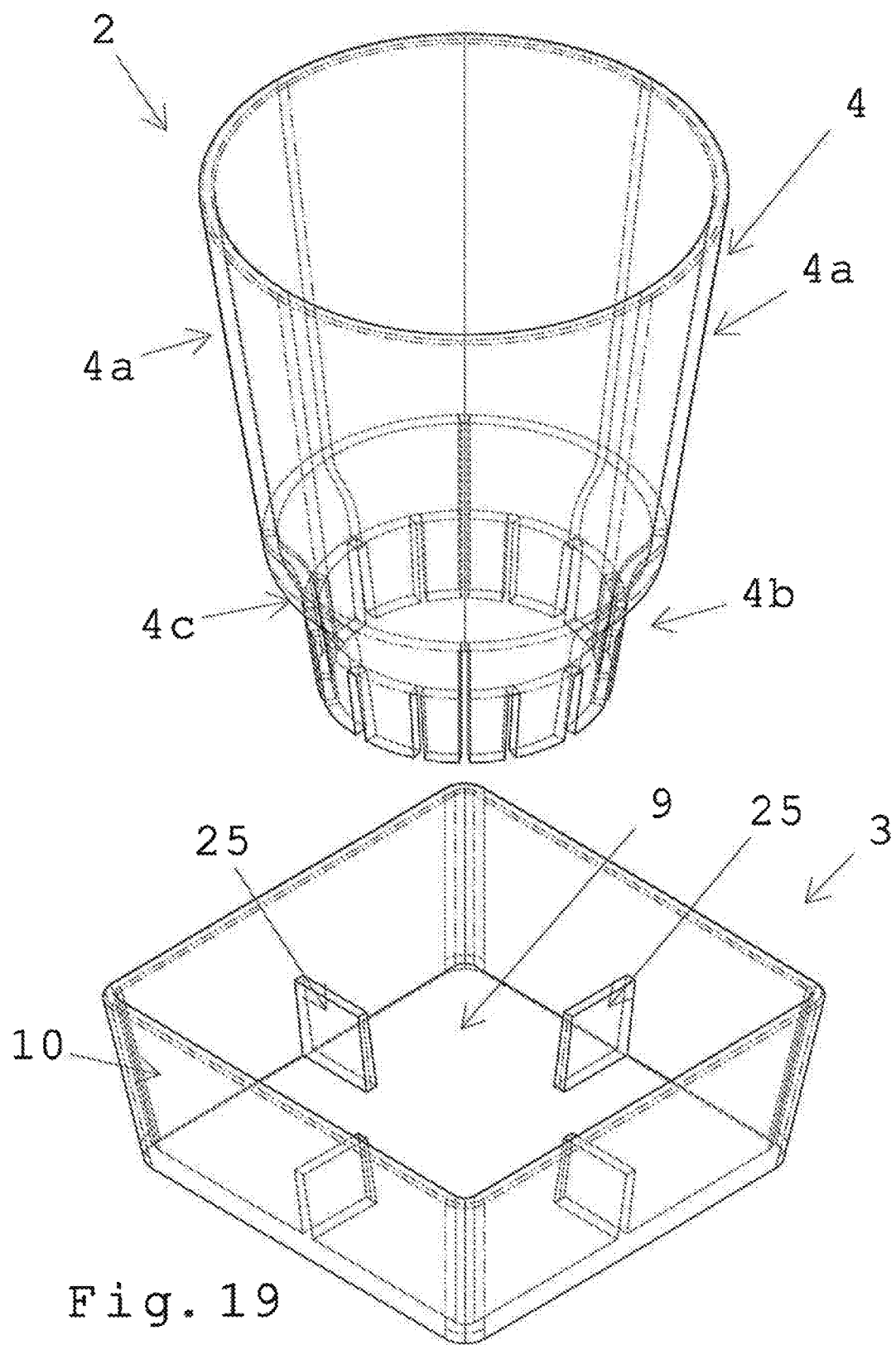
FIG. 19 shows a third embodiment of the flower pot according to the invention when inserting the inner element into the outer element.
Figure 20:
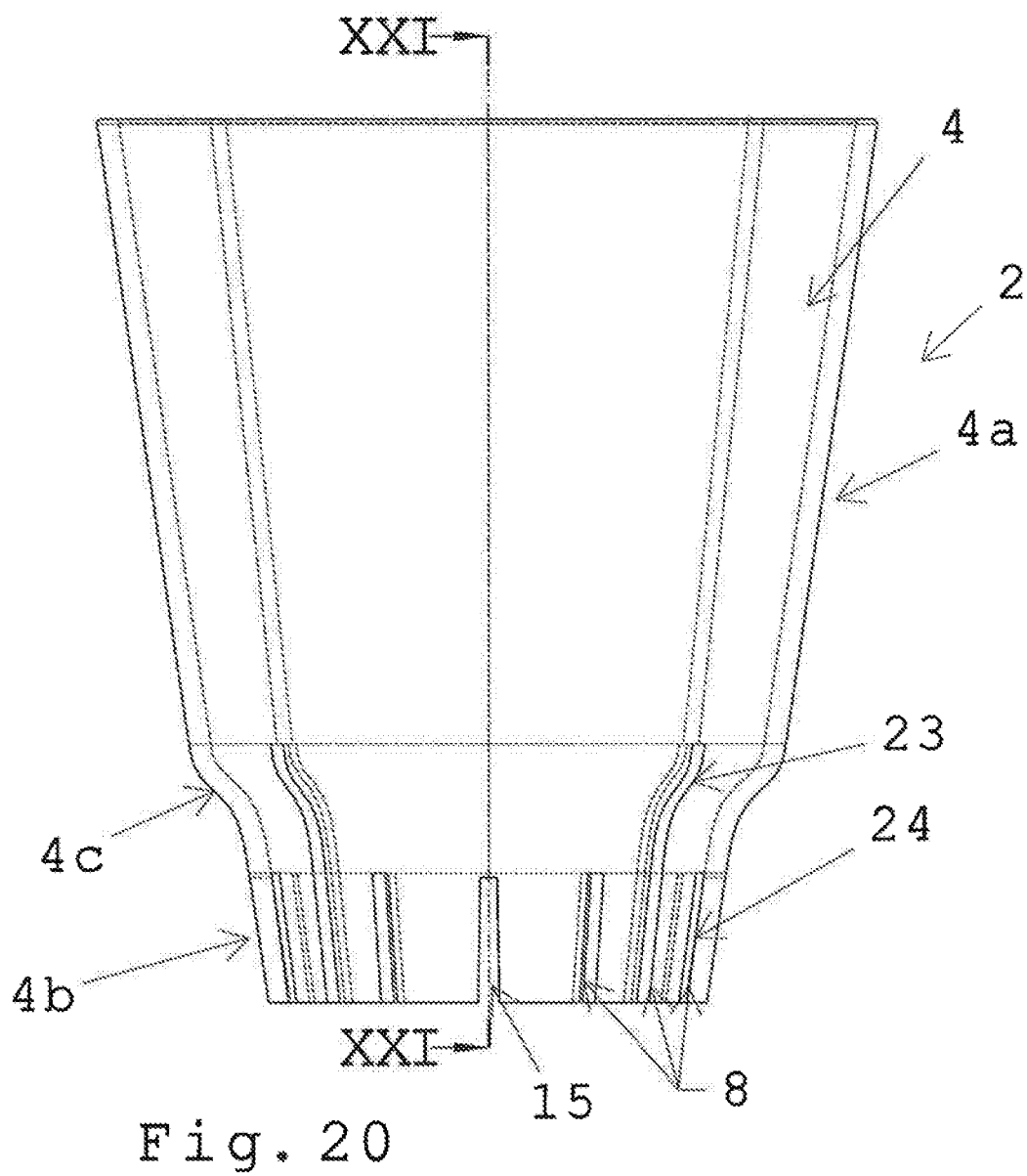
FIG. 20 shows a lateral view of the inner element of the flower pot according to FIG. 19.
Figure 21:
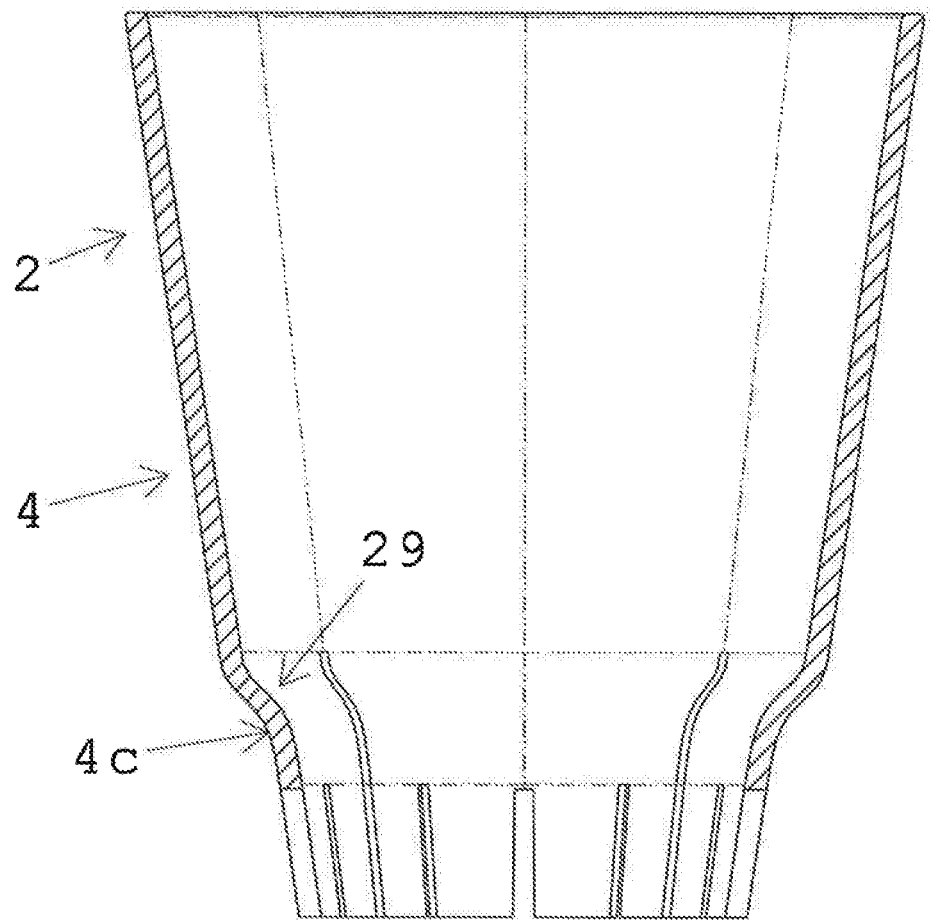
FIG. 21 shows a section along the line XXI-XXI in FIG. 20.
Figure 22:
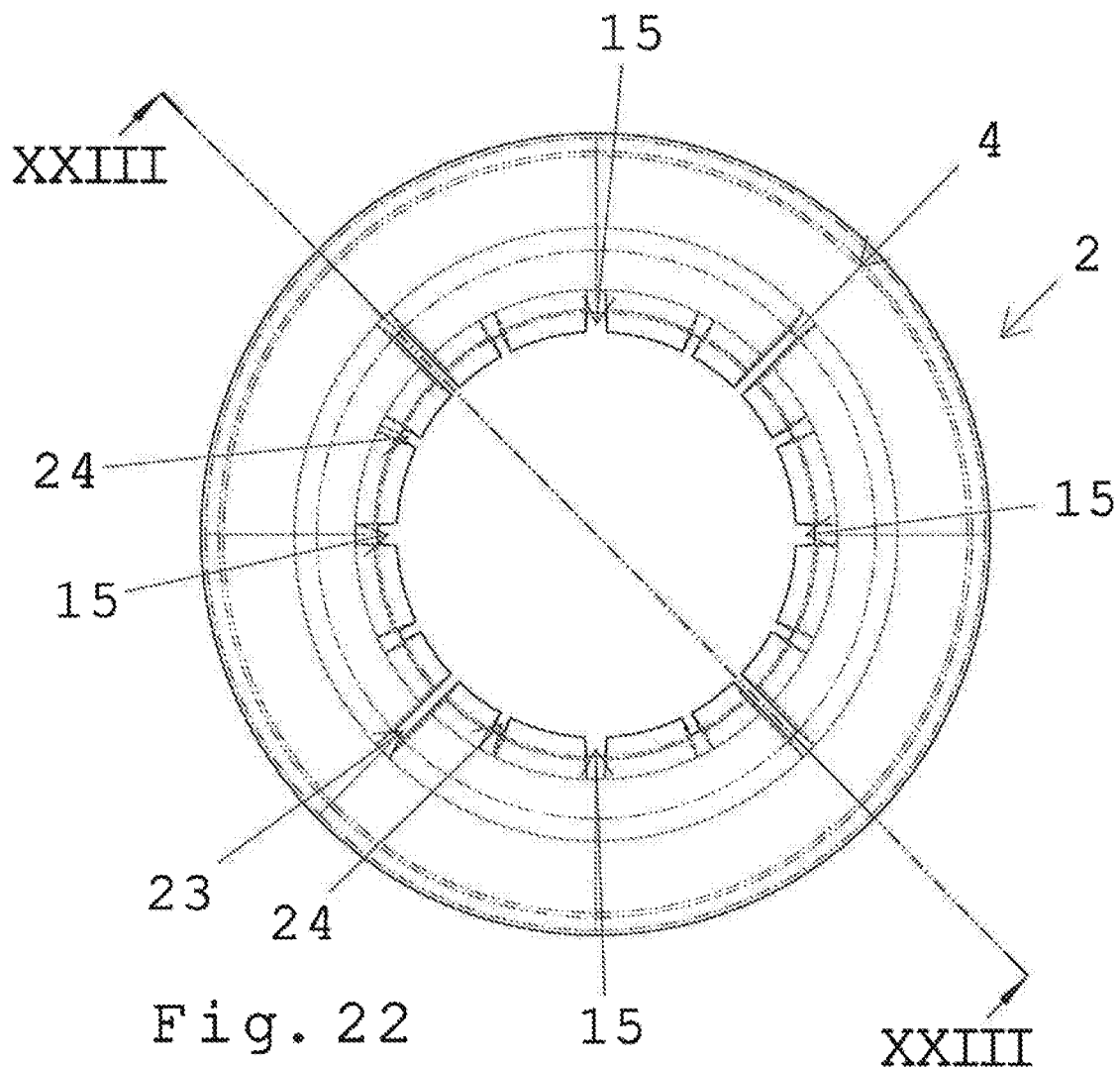
FIG. 22 shows a top view of the inner element according to FIGS. 20, 21.
Figure 23:
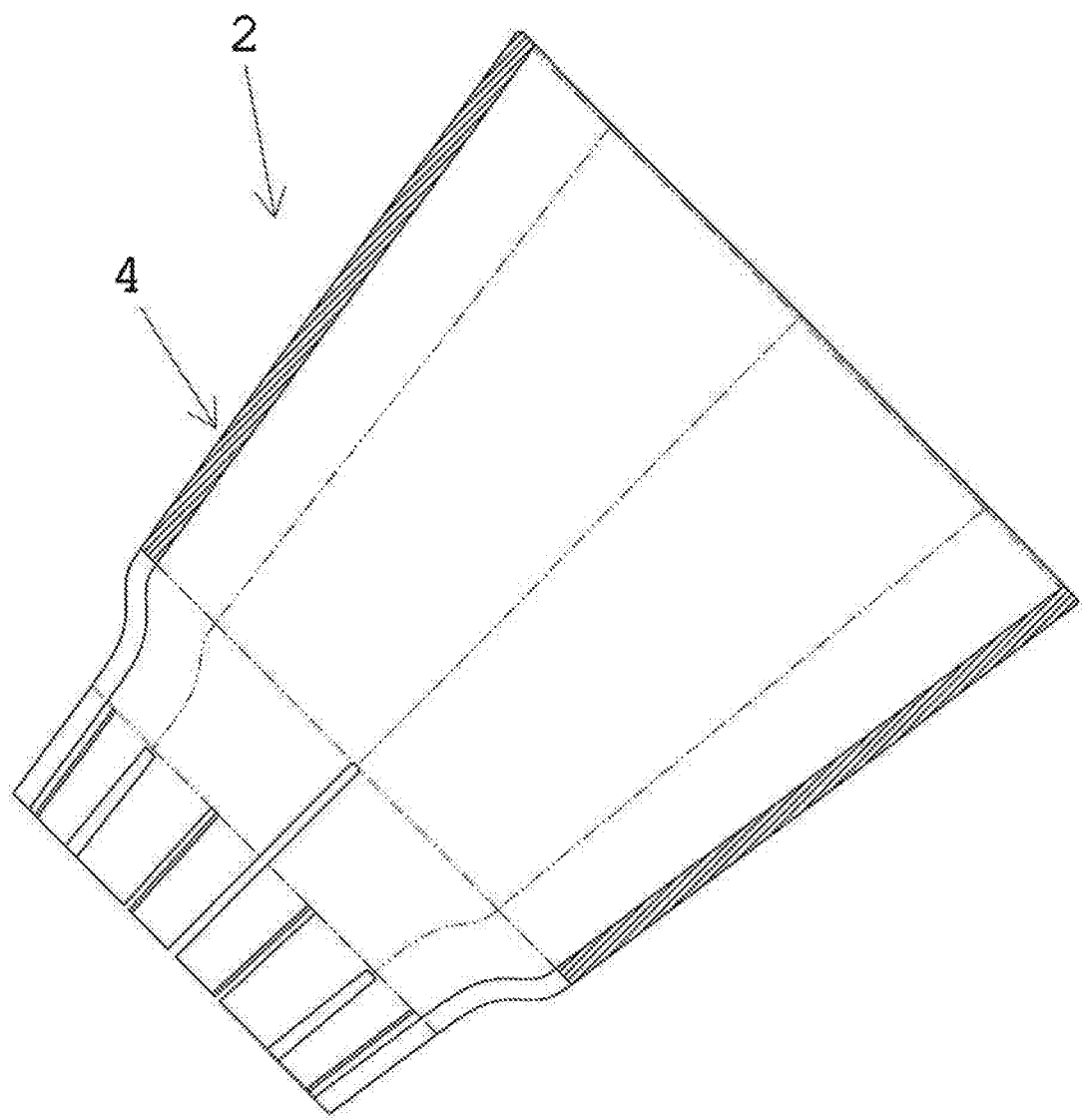
FIG. 23 shows a section along the line XXIII-XXIII in FIG. 22.

FIG. 9 shows an alternative of the embodiment of FIGS. 1 to 8, wherein the outer element 3 is set up for the arrangement of a plurality of inner elements 2. For this purpose, the outer contour of the outer element has the shape of an elongate rectangle in the top view, comprising corresponding plug connectors 14, in order to be able to receive a plurality of inner elements 2, which in particular have a circular cross section and which widen conically to the top.

The inner element 2 is placed onto a base 9 of the outer element 3. The outer element 3 has a circumferential lateral wall 10, which protrudes upwards from the outer edge of the base 9, so that the outer element 3 is embodied as trough, which is open to the top. The lateral wall 10 is inclined to the outside, in order to be able to stack a plurality of corresponding outer elements 3. The base 9 and the lateral wall 10 limit a liquid storage chamber 11 of the outer element 3. The lateral wall 10 of the outer element 3 has a height, which lies between a conventional coaster comprising a circumferential flange and a conventional outer pot of a hydro vessel. The lateral wall 10 of the outer element 3 thus has a smaller height (i.e. extension in the direction of the longitudinal axis 7) than the cover 4 of the inner element 2, wherein the ratio between the height of the lateral wall 10 of the outer element 3 and the height of the cover 4 of the inner element 2 is approximately one third in the shown embodiment. The outer element 3 can thus act as reservoir for watering or nutrient liquid, respectively, which can enter into the interior of the inner element 2 via the liquid passage openings 8.

In the use state of the flower pot 1 as intended, i.e. after the assembly of inner element 2 and outer element 3, a plurality of filling and viewing openings 12 is provided between the cover 4 of the inner element 2 and the lateral wall 10 of the outer element, which filling and viewing openings 12 are set up for filling liquid into the liquid storage chamber 11 on the one hand and for visual inspection of a level of the liquid in the liquid storage chamber 11 of the outer element 3 on the other hand.

To form large-area filling and viewing openings 12 on the four corner areas of the outer element 3, the cover 4 of the inner element 2 has an essentially circular cross section in the shown embodiment, whereas the lateral wall 10 of the outer element 3, in top view, is essentially rectangular, preferably square comprising rounded corners.

As can further be seen from FIG. 1, a plug connection 13 is provided between the outer element 3 and the inner element 2, by means of which plug connection 13 the inner element 2, in the mounted state, is arranged on the outer element 3 in a non-rotatable manner around the longitudinal axis 7 of the inner element 2 and in an essentially non-tiltable manner. The plug connection 13 is formed by means of at least two, in the shown embodiment four, plug connectors 14 and at least two, in the shown embodiment four, corresponding plug recesses 15.

In the embodiment of FIGS. 1 to 9, the plug recesses 15 are formed as notches 16 in the cover 4 of the inner element 2. In the interior of the inner element 2, the notches 16 form top-side mounting surfaces 17 for a (non-illustrated) inner pot. Slit-shaped recesses 18, which extend in the direction of the longitudinal axis 7, are further provided on the cover 4 in the area of the notches 16. These slit-shaped recesses 18 serve to receive corresponding protrusions 19 on the plug connectors 14.

As can be seen from FIG. 8, the plug connectors 14 are formed as bulges 20, which protrude upwards from the base 9 of the outer element 3.

In the case of this embodiment, the plug connectors 14 and the plug recesses 15 in each case taper upwards in the cross section in the direction of the longitudinal axis 7 of the inner element 2, i.e. towards the filling and viewing openings 12.

It can additionally be seen from FIG. 9 that the base 9 of the outer element 3 has a depression 30, the depth of which corresponds essentially to the wall thickness of the base part 2a of the inner element 2, so that the water can reach essentially completely from the water reserve into the inner element 2. The base part 2a of the inner element 2 is arranged in the depression 30 of the outer element 3 so as to fit accurately. In the shown embodiment, the depression 30 is thus circular in the top view.

Figure 6:
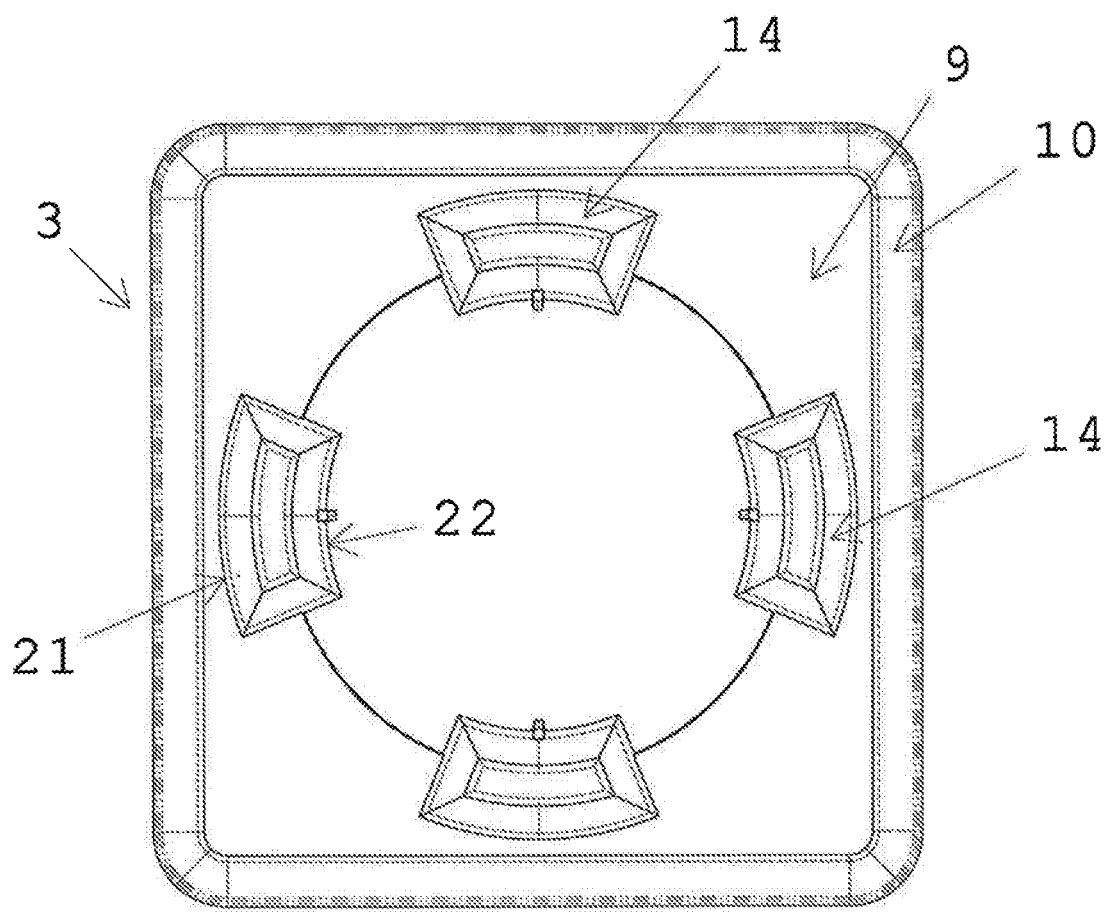
FIG. 6 shows a top view of the outer element of the flower pot according to FIG. 1.
Figure 7:
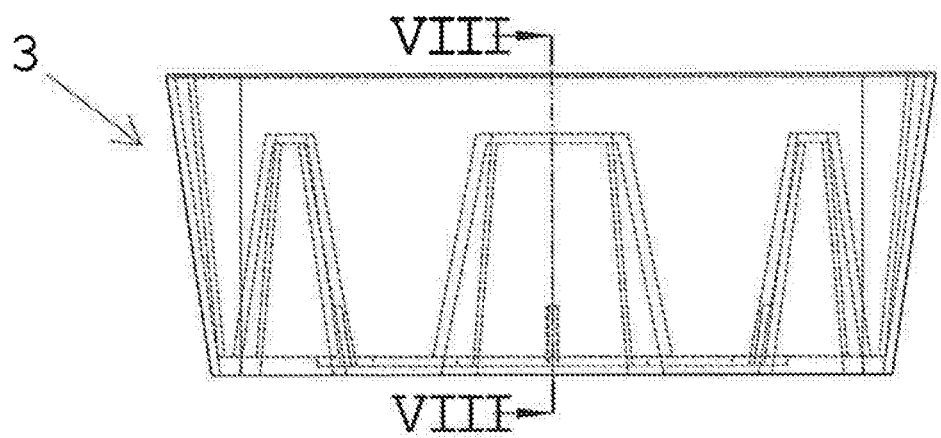
FIG. 7 shows a lateral view of the outer element of the flower pot according to FIGS. 1, 6.

As can be seen from FIG. 6, each plug connector 14 in the case of this embodiment alternative has an arcuate outer limiting line 21 and an arcuate inner limiting line 22, the course of which corresponds to the curvature of the inner element 2, which has a circular cross section.

As can be seen from FIGS. 1 to 5, the liquid passage openings 8 of the inner element are formed by a first number of openings 23, in the shown embodiment first slits, and a second number of openings 24, in the shown embodiment second slits in turn. The first number of openings 23 has a larger extension in the longitudinal direction of the inner element 2 than the second number of openings 24.

In the case of the embodiment of FIGS. 10 to 19, plate parts 25, which extend essentially perpendicular to the section of the lateral wall 10 of the outer element 3 connected thereto and which, in the mounted state, are arranged in slit-shaped plug recesses 26 of the inner element 2, are provided as plug connector 14. In the case of this embodiment, the slit-shaped plug recesses 26 are formed on depressions 27 in the cover 4 of the inner element 2.

Top-side support surfaces 28 for a (non-illustrated) inner pot are formed on the depressions 27 in the interior of the inner element 2.

In the case of the embodiment alternative of FIGS. 19 to 23, the inner element 2 has a tapering section 4c between the receiving section 4a and the watering section 4b. A ledge 29 for an inner pot is thus formed on the tapering section 4c in the interior of the inner element 2.

The invention claimed is:

1. A flower pot comprising
an inner element comprising an upwardly projecting, circumferential cover, on which a plurality of liquid passage openings are formed,
wherein a first number of openings and a second number of openings are provided as the plurality of liquid passage openings of the inner element, wherein first slits are provided as the first number of openings of the inner element and second slits are provided as the second number of openings,
an outer element surrounding the inner element, comprising a base, a lateral wall protruding from the base, and comprising a liquid storage chamber,
wherein the lateral wall of the outer element comprises a smaller height than the upwardly projecting, circumferential cover of the inner element and
at least one filling and viewing opening is formed between an outer side of the upwardly projecting, circumferential cover of the inner element and an inner side of the lateral wall of the outer element for filling liquid into the liquid storage chamber and for visually inspecting a level of the liquid in the liquid storage chamber of the outer element,
and wherein
the first slits comprise a larger extension in a longitudinal direction of the upwardly projecting, circumferential cover of the inner element than the second slits, wherein the first slits and the second slits are arranged on a circumference of the inner element so as to alternate in a circumferential direction and wherein the first slits and the second slits project upwards from a lower edge of the upwardly projecting, circumferential cover of the inner element in such a way that the plurality of liquid passage openings can be used to control the liquid level in the liquid storage chamber.

2. The flower pot according to claim 1, wherein the ratio between the height of the lateral wall of the outer element and the height of the upwardly projecting, circumferential cover of the inner element is between 1:5 and 1:1.5.

3. The flower pot according to claim 1, wherein a plug connection is provided between the outer element and the inner element, by means of which plug connection the inner element, in a mounted state, is arranged on the outer element in a non-tiltable manner and in a non-rotational manner around the longitudinal axis of the inner element.

4. The flower pot according to claim 3, wherein the plug connection comprises at least two plug connectors and at least two-corresponding plug recesses.

5. The flower pot according to claim 4, wherein the plug recesses are formed as notches in the upwardly projecting, circumferential cover of the inner element, wherein top-side mounting surfaces for an inner pot are formed on the notches in an interior of the inner element.

6. The flower pot according to claim 4, wherein the plug connectors are formed as bulges on the base of the outer element.

7. The flower pot according to claim 4, wherein the plug connectors and the plug recesses each taper towards the filling and viewing opening in a cross section in the longitudinal direction of the inner element.

8. The flower pot according to claim 4, wherein plate parts, which, in the mounted state, are arranged in slit-shaped plug recesses of the inner element, are provided as plug connectors, which plate parts are arranged essentially perpendicular to the lateral wall of the outer element.

9. The flower pot according to claim 8, wherein the slit-shaped plug recesses are formed on depressions in the upwardly projecting, circumferential cover of the inner element, wherein top-side support surfaces for an inner pot are formed on the depressions in the interior of the inner element.

10. The flower pot according to claim 9, wherein the inner element comprises an upper section, which is essentially conical, and a lower section, which is essentially conical, which are connected to one another via a tapering section, wherein a ledge for an inner pot is formed on the tapering section in the interior of the inner element.

11. The flower pot according to claim 1, wherein the upwardly projecting, circumferential cover of the inner element comprises a first cross sectional shape, and that the lateral wall of the outer element comprises a second cross sectional shape, which differs therefrom.

12. The flower pot according to claim 1, wherein the height of the lateral wall of the outer element is 1 to 1.5-times the extension of the first number of openings in the longitudinal direction of the inner element.

13. The flower pot according to claim 1, wherein the inner element and/or the outer element each comprises sections, which widen upwards in the longitudinal direction.

14. The flower pot according to claim 1, wherein the inner element is a plurality of inner elements arranged in the outer element.

* * * * *